US010024514B2

(12) United States Patent
Kanayama et al.

(10) Patent No.: US 10,024,514 B2
(45) Date of Patent: Jul. 17, 2018

(54) LIGHTING APPARATUS AND MOBILE OBJECT INCLUDING THE SAME

(71) Applicant: Panasonic Intellectual Property Management Co., Ltd., Osaka (JP)

(72) Inventors: Yoshihiko Kanayama, Hyogo (JP); Hiro Aoki, Osaka (JP); Tomoyuki Ogata, Osaka (JP); Masashi Kichima, Niigata (JP); Makoto Kai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 15/053,851

(22) Filed: Feb. 25, 2016

(65) Prior Publication Data

US 2016/0265734 A1 Sep. 15, 2016

(30) Foreign Application Priority Data

Mar. 11, 2015 (JP) ................................ 2015-048171
Mar. 11, 2015 (JP) ................................ 2015-048388
(Continued)

(51) Int. Cl.
*B60Q 1/00* (2006.01)
*F21S 8/10* (2006.01)
(Continued)

(52) U.S. Cl.
CPC ........... *F21S 48/328* (2013.01); *F21S 41/143* (2018.01); *F21S 41/147* (2018.01); *F21S 41/24* (2018.01);
(Continued)

(58) Field of Classification Search
CPC .. F21S 48/328; F21S 48/1154; F21S 48/1159; F21S 48/1225; F21S 48/1241;
(Continued)

(56) References Cited

U.S. PATENT DOCUMENTS 7,722,232 B2 5/2010 Nakada et al.
2004/0202007 A1 * 10/2004 Yagi .................... F21S 48/1159 362/547
(Continued)

FOREIGN PATENT DOCUMENTS

JP 2008-243433 A 10/2008
JP 2010-118203 A 5/2010

*Primary Examiner* — Y M. Lee
(74) *Attorney, Agent, or Firm* — McDermott Will & Emery LLP

(57) ABSTRACT

A lighting apparatus to be installed on a mobile object includes: a heat dissipator having a first outer surface and a second outer surface different from the first outer surface; a first light-emitting device thermally coupled to the first outer surface of the heat dissipator; a second light-emitting device thermally coupled to the second outer surface of the heat dissipator; a reflector that reflects light emitted from the first light-emitting device; a first lens that is disposed in a path of light reflected by the reflector and that transmits the light from the reflector along a predetermined lighting direction; and a second lens disposed in a path of light from the second light-emitting device.

12 Claims, 16 Drawing Sheets

(30) Foreign Application Priority Data

Mar. 11, 2015 (JP) ................................ 2015-048642
Mar. 11, 2015 (JP) ................................ 2015-048735

(51) Int. Cl.

| | |
|---|---|
| ***F21S 41/143*** | (2018.01) |
| ***F21S 41/147*** | (2018.01) |
| ***F21S 41/20*** | (2018.01) |
| ***F21S 41/24*** | (2018.01) |
| ***F21S 41/265*** | (2018.01) |
| ***F21S 41/32*** | (2018.01) |
| ***F21S 41/33*** | (2018.01) |
| ***F21S 41/36*** | (2018.01) |
| ***F21S 41/43*** | (2018.01) |
| ***F21S 41/663*** | (2018.01) |
| ***F21S 45/47*** | (2018.01) |

(52) U.S. Cl.
CPC ........... *F21S 41/265* (2018.01); *F21S 41/285* (2018.01); *F21S 41/321* (2018.01); *F21S 41/333* (2018.01); *F21S 41/36* (2018.01); *F21S 41/43* (2018.01); *F21S 41/663* (2018.01); *F21S 45/47* (2018.01)

(58) Field of Classification Search
CPC .. F21S 48/1275; F21S 48/1388; F21S 48/145; F21S 48/1747; F21S 48/14; F21S 48/115; F21S 41/143; F21S 41/147; F21S 41/285; F21S 41/24; F21S 41/265; F21S 41/321; F21S 41/333; F21S 41/36; F21S 41/43; F21S 41/663; F21S 45/47
See application file for complete search history.

(56) References Cited

U.S. PATENT DOCUMENTS

2008/0239741 A1 10/2008 Nakada et al.
2010/0118559 A1 5/2010 Nakada
2010/0226142 A1* 9/2010 Brendle ............... F21S 48/1154 362/512
2010/0246204 A1* 9/2010 Inaba .................. F21S 48/1388 362/539
2013/0107564 A1* 5/2013 Yatsuda ............... F21S 48/1159 362/543
2013/0121011 A1* 5/2013 Langkabel ............... B60Q 1/04 362/545
2013/0194816 A1* 8/2013 Hager .................... F21S 48/115 362/511
2016/0238206 A1* 8/2016 Honda ................. F21S 48/1154
2017/0227184 A1* 8/2017 Ishida ................. F21S 48/1747

* cited by examiner

LIGHTING APPARATUS AND MOBILE OBJECT INCLUDING THE SAME

CROSS REFERENCE TO RELATED APPLICATIONS

This application claims the benefit of priority of Japanese Patent Application Number 2015-048388 filed on Mar. 11, 2015, Japanese Patent Application Number 2015-048642 filed on Mar. 11, 2015, Japanese Patent Application Number 2015-048735 filed on Mar. 11, 2015, and Japanese Patent Application Number 2015-048171 filed on Mar. 11, 2015, the entire content of which is hereby incorporated, by reference.

BACKGROUND

1. Technical Field

The present disclosure relates to a lighting apparatus and a mobile object including the same.

2. Description of the Related Art

Vehicles such as automobiles are equipped with lamps such as headlamps in the front. Headlamps include, a housing and a lighting apparatus attached to the housing.

This type of vehicle lighting apparatus (headlamp) includes, for example, a light-emitting device, a reflector that reflects light from the light-emitting device forward, and a projection lens that is disposed in front of the light-emitting device so as to transmit the light reflected by the reflector (for example, see Japanese Unexamined Patent Application Publication No. 2010-118203 and Japanese Unexamined Patent Application Publication No. 2008-243433).

SUMMARY

However, the conventional vehicle lamps described above form a light distribution pattern using a plurality of lamp units. Thus, there is a problem that the design freedom of the automobile decreases since a plurality of lamp units are required to be disposed in the front of the automobile.

In view of this, an object of the present disclosure is to provide a lighting apparatus which allows for an increase in design freedom of a mobile object such as an automobile, and a mobile object including the lighting apparatus.

In order to achieve the above object, a lighting apparatus according to an aspect of the present disclosure is a lighting apparatus to be installed on a mobile object, and includes: a heat dissipator having a first outer surface and a second outer surface different from the first outer surface; a first light-emitting device thermally coupled to the first outer surface of the heat dissipator; a second light-emitting device thermally coupled to the second outer surface of the heat dissipator; a reflector that reflects light emitted from the first light-emitting device; a first lens that is disposed in a path of light reflected by the reflector and that transmits the light from the reflector along a predetermined lighting direction; and a second lens disposed in a path of light from the second light-emitting device.

Moreover, a mobile object according to one aspect of the present disclosure includes the above described lighting apparatus installed in the front portion.

According the present disclosure, it is possible to provide a lighting apparatus which allows for an increase in design freedom of a mobile object, and a mobile object including the lighting apparatus.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT(S)

Figure 1:
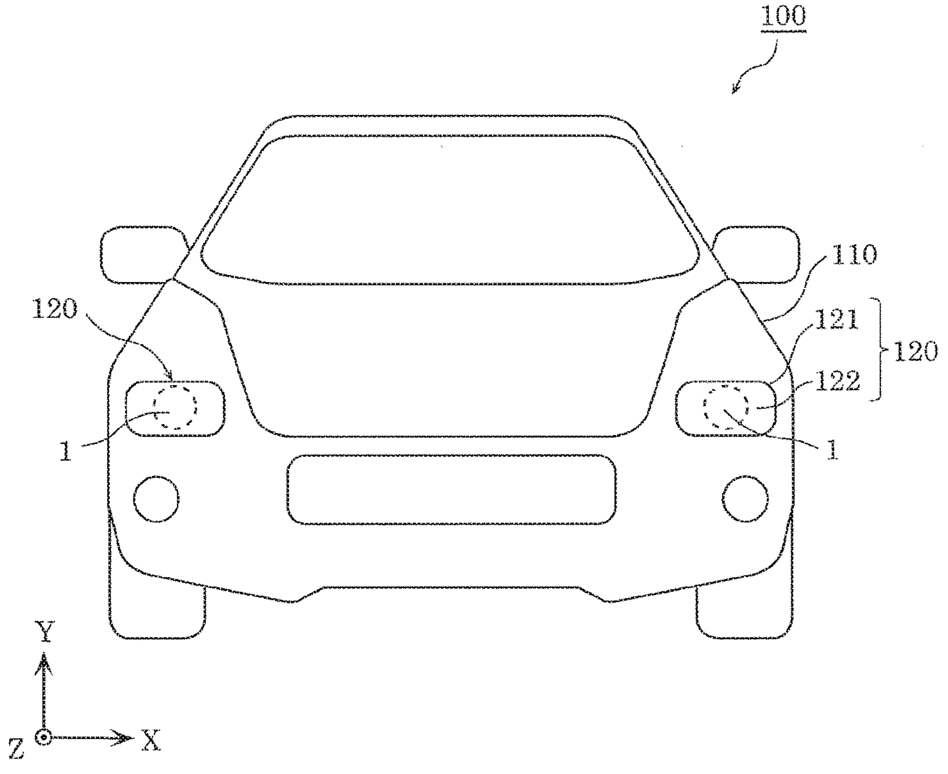
FIG. 1 is a front view of an automobile according to Embodiment 1 of the present disclosure.

The following describes a lighting apparatus and mobile object according to embodiments of the present disclosure with reference to the drawings. Note that the each embodiment described below shows a specific example of the present disclosure. The numerical values, shapes, materials, elements, the arrangement and connection of the elements, and others indicated in the following embodiments are mere examples, and therefore do not intend to limit the inventive concept. Therefore, among the elements in the following embodiments, those not recited in any of the independent claims defining the most generic part of the inventive concept are described as arbitrary elements.

As described herein, "front" and "forward" refer to the direction in which light is emitted from the lighting apparatus (i.e., the light-emitting direction) and the light-extraction direction in which light is extracted (i.e., the lighting direction), and "back" and "rearward" refer to the direction opposite the direction to which "front" and "forward" refer. Moreover, "front" and "forward" refer to the direction of travel when the automobile moves forward, "right" and "left" are from the perspective of the driver of the automobile when facing forward, "up" refers to the direction toward the ceiling of the automobile, and "down" and "downward" refer to the direction opposite the direction to which "up" refers.

The Z axis corresponds to the front and back directions, the Y axis corresponds to the up and down (vertical) directions, and the X axis corresponds to the left and right (horizontal, lateral) directions. In other words, in the following embodiments, the predetermined lighting direction refers to the direction in which the lighting apparatus projects light, i.e., "forward", i.e., the positive direction of the Z axis.

Note that the drawings are represented schematically and are not necessarily precise illustrations. Additionally, like elements share like reference numbers in the drawings. Also note that the term "approximately", such as in "approximately the same", is used throughout the specification. Here, in addition to meaning exactly the same, "approximately the same" means, for example, essentially the same, i.e., includes deviations of about a few percent. This applies to other phrases where "approximately" is used as well.

Embodiment 1

Automobile

First, automobile 100 according to Embodiment 1 of the present disclosure will be described with reference to FIG. 1. FIG. 1 is a front view of automobile 100 according to Embodiment 1.

As illustrated in FIG. 1, automobile 100 according to Embodiment 1 is one example of a mobile object, such as a four-wheeled automobile, and includes vehicle body (vehicle) 110, and headlamps 120 disposed on the left and right sides of the front of vehicle body 110. Automobile 100 is, for example, an automobile propelled by a gasoline engine or an automobile propelled by an electric motor.

Headlamps 120 are lamps, and in Embodiment 1, are headlights installed on a vehicle (i.e., vehicle headlamps). Each headlamp 120 includes housing 121, front cover 122, and lighting apparatus 1 attached behind front cover 122.

Housing 121 is, for example, a metal housing, and includes an opening through which light from lighting apparatus 1 is emitted. Front cover 122 is a light-transmissive headlamp cover and is disposed at the opening of housing 121. Housing 121 and front cover 122 are sealed together so water or dust, for example, does not enter housing 121.

Lighting apparatus 1 is disposed behind front cover 122 and attached to housing 121. Light emitted by lighting apparatus 1 passes through front cover 122 and out of lighting apparatus 1.

Lighting Apparatus

Next, lighting apparatus 1 according to Embodiment 1 will be described with reference to FIG. 2 through FIG. 4.

Figure 2:
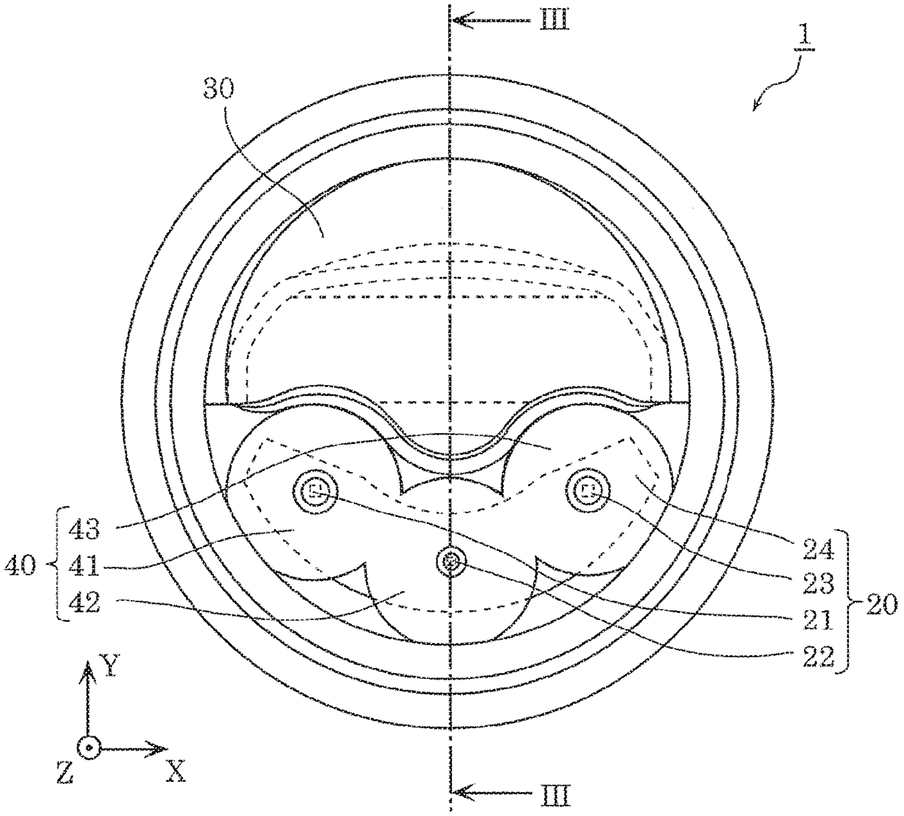
FIG. 2 is a front view of a lighting apparatus according to Embodiment 1 of the present disclosure.

FIG. 2 is a front view of lighting apparatus 1 according to Embodiment 1. FIG. 3 is a cross sectional view of lighting apparatus 1 according to Embodiment 1, taken along line III-III in FIG. 2. FIG. 4 is a cross sectional view of lighting apparatus 1 according to Embodiment 1, taken along line III-III in FIG. 2, illustrating light paths of light emitted by low beam light-emitting device 11. More specifically, FIG. 3 and FIG. 4 are vertical cross sections taken down the center of lighting apparatus 1.

Figure 3:
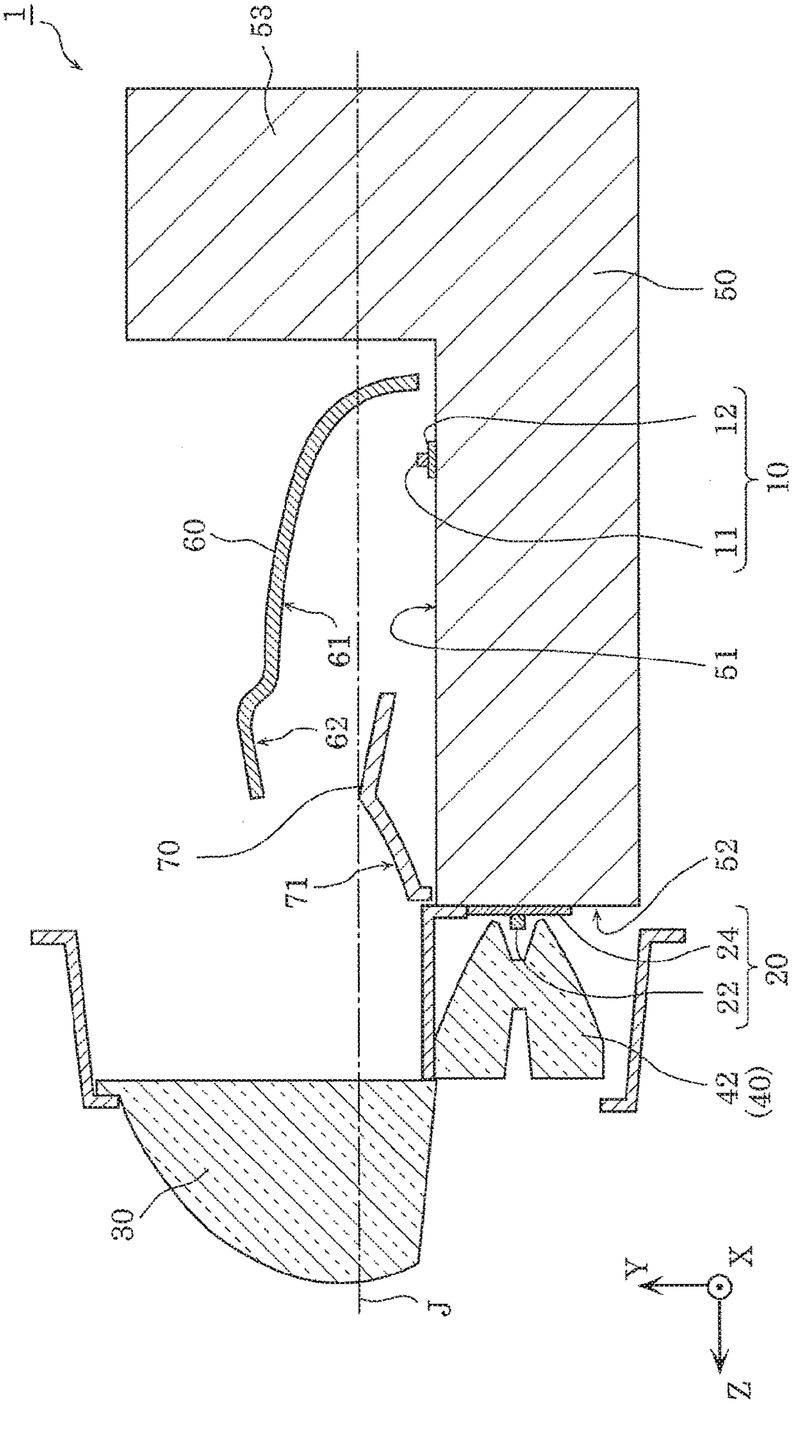
FIG. 3 is a cross sectional view of a lighting apparatus according to Embodiment 1 of the present disclosure, taken along line in FIG. 2.
Figure 4:
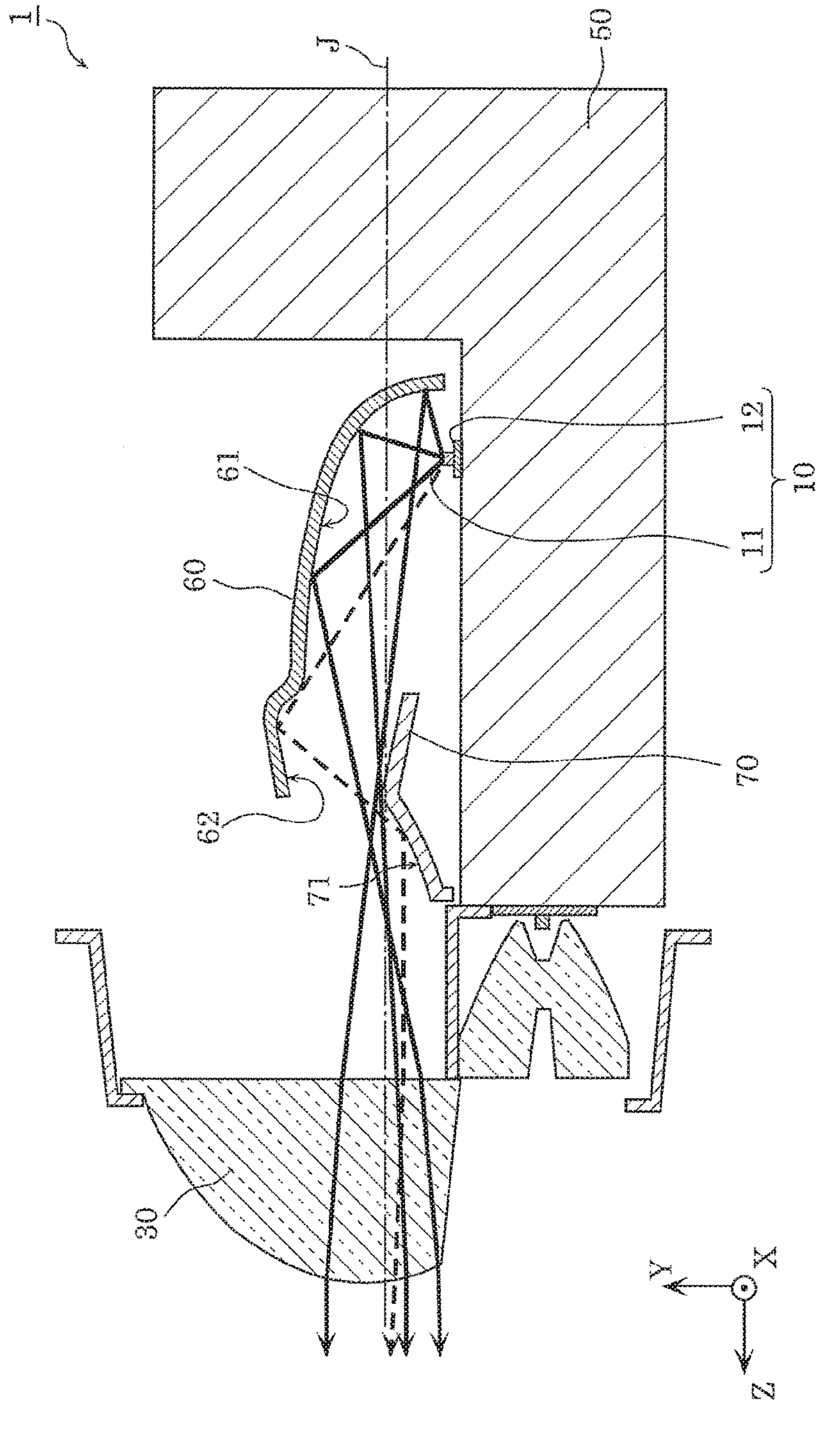
FIG. 4 is a cross sectional view of a lighting apparatus according to Embodiment 1 of the present disclosure, taken along line III-III in FIG. 2, and illustrates paths of light emitted by a low beam light-emitting device.

Note that in FIG. 3 and FIG. 4, the dotted and dashed horizontal line represents central axis J of low beam lens 30. Central axis J is approximately aligned with the optical axis of low beam lens 30, and passes through the approximate center of lighting apparatus 1.

Lighting apparatus 1 according to Embodiment 1 is installed on a mobile object. Lighting apparatus 1 is, for example, a vehicle lighting apparatus used in a vehicle headlamp, and emits light forward. In other words, "forward." relative to the vehicle is equivalent to the light-emitting direction of lighting apparatus 1, and equivalent to the lighting direction of lighting apparatus 1. As illustrated in FIG. 1, lighting apparatuses 1 are disposed in the front of vehicle body 110.

As illustrated in FIG. 2 and FIG. 3, lighting apparatus 1 includes, as the main body of the lamp, low beam light source module 10, high beam light source module 20, low beam lens 30, high beam lens 40, heat dissipator 50, reflector 60, and shield 70. Although not illustrated in the Drawings, lighting apparatus 1 further includes a lighting controller that controls low beam light source module 10 and high beam light source module 20.

Lighting apparatus 1 is an integrated tamp capable of emitting a high beam, which is a driving beam, and a low beam, which is a passing beam. Note that the high beam illuminates an area far ahead of automobile 100, and the low beam illuminates an area forward and downward of automobile 100.

As illustrated in FIG. 2, lighting apparatus 1 is configured to fit within a predetermined circular region when viewed from the lighting direction when viewed along the Z axis). More specifically, low beam light source module 10, high beam light source module 20, low beam lens 30, high beam lens 40, heat dissipator 50, reflector 60, and shield 70 form a unit that fits within a predetermined circular region when viewed along the Z axis. The predetermined circular region is, for example, ϕ 70 mm (in diameter).

Note that lighting apparatus 1 according to Embodiment 1 is installed on automobile 100 configured for roads where the driving lane (i.e., the lane in which the driver drives his or her own vehicle) is the right lane and the oncoming traffic lane is the left lane relative to the direction of travel, such as in the United States of America. When lighting apparatus 1 is to be installed on an automobile configured for roads where the driving lane is the left lane and the oncoming traffic lane is the right lane relative to the direction of travel, such as in Japan, the configuration described below may be reversed left and right about central axis J of lighting apparatus 1.

Hereinafter, each element of lighting apparatus 1 will be described in detail.

Low Beam Light Source Module

Low beam light source module 10 is one example of a first light source that emits light for short-distance illumination. More specifically, low beam light source module 10 is a light-emitting diode (LED) module for generating a low beam and is turned on when an area forward and downward of vehicle body 110 is to be illuminated—that is, more specifically, when the road surface is to be illuminated.

Low beam light source module 10 is turned on when the surrounding environment is dark, such as at night or in a tunnel. In Embodiment 1, low beam light source module 10 turns on when the high beam is to be emitted (for long-distance illumination) in addition to when just the low beam is to be emitted (for short-distance illumination). In other words, in Embodiment 1, the high beam is formed of the light emitted by low beam light source module 10 and the light emitted by high beam light source module 20.

Low beam light source module 10 is a white light source and is, for example, a B-Y type white LED light source, which emits white light using a blue LED chip that emits blue light and a yellow phosphor. Alternatively, low beam light source module 10 may be a white LED light source that emits white light using LED chips emitting blue, red, and green light.

As illustrated in FIG. 3, low beam light source module 10 includes low beam light-emitting device 11 and substrate 12 on which low beam light-emitting device 11 is mounted.

Low beam light source module 10 may be a surface mount device (SMD) module, and may be a chip on board (COB) module.

When low beam light source module 10 is an SMD module, low beam light-emitting device 11 is an SMD LED device that has an LED chip (bare chip) mounted and sealed with a sealant (phosphor-containing resin) in a resin package. When low beam light source module 10 is a COB module, low beam light-emitting device 11 is an LED chip (bare chip) itself, and is directly mounted on substrate 12. In this case, the LED chip mounted on substrate 12 is sealed with a sealant such as a phosphor-containing resin.

Low beam light source module 10 is fixed to heat dissipator 50. More specifically, as illustrated in FIG. 3, substrate 12 is placed on and fixed to a predetermined placement surface 51 of heat dissipator 50. In Embodiment 1, substrate 12 is disposed lying down (i.e., disposed horizontally) so low beam light source module 10 emits light upward. In other words, the optical axis of low beam light source module 10 (low beam light-emitting device 11) is parallel to the Y axis.

Low beam light-emitting device 11 is one example of a first light-emitting device that emits light that is to pass through low beam lens 30. Low beam light-emitting device 11 is disposed at a focal point of reflector 60 (disposed at a first focal point). Low beam light-emitting device 11 is positioned below central axis J of low beam lens 30. Low beam light-emitting device 11 is thermally coupled to placement surface 51 of heat dissipator 50.

Substrate 12 is, for example, a ceramic substrate including, for example, alumina, a resin substrate including resin, or an insulated metal substrate including a metal base covered by a layer of insulating material. Substrate 12 has a shape in a plan view corresponding to the shape of placement surface 51 of heat dissipator 50 on which substrate 12 is placed.

High Beam Light Source Module

High beam light source module 20 is one example of a second light source that emits light for long-distance illumination. More specifically, high beam light source module 20 is an LED module for generating a high beam and is turned on when an area far ahead of vehicle body 110 (including areas above the horizon plane) is to be illuminated.

High beam light source module 20 is turned on when the surrounding environment is dark, such as at night or in a tunnel, and there are no oncoming vehicles in the oncoming traffic lane. More specifically, high beam light source module 20 is turned on when the high beam is to be emitted.

High beam light source module 20 is a white light source and is, for example, a B-Y type white LED light source, which emits white light using a blue LED chip that emits blue light and a yellow phosphor. Alternatively, high beam light source module 20 may be a white LED light source that emits white light using LED chips emitting blue, red, and green light.

High beam light source module 20 may be an SMD module and, alternatively, may be a COB module. Details regarding the structures of SMD and COB modules are the same as described with respect to low beam light source module 10.

As illustrated in FIG. 2 and FIG. 3, high beam light source module 20 includes high beam light-emitting devices 21 through 23 and substrate 24 on which high beam light-emitting devices 21 through 23 are mounted.

High beam light source module 20 is fixed to heat dissipator 50. More specifically, as illustrated in FIG. 3, substrate 24 is placed on and fixed to a predetermined placement surface 52 of heat dissipator 50. In Embodiment 1, substrate 24 is disposed standing up (i.e., disposed vertically) so high beam light source module 20 emits light forward. In other words, the optical axis of high beam light source module 20 (high beam light-emitting devices 21 through 23) is parallel to the Z axis.

In this way, high beam light source module 20 and low beam light source module 10 are fixed to the same heat dissipator 50. More specifically, high beam light source module 20 and low beam light source module 10 are placed on and fixed to different placement surfaces on heat dissipator 50.

High beam light-emitting devices 21 through 23 are each one example of a second light-emitting device that emits light that is to pass through high beam lens 40. High beam light-emitting devices 21 through 23 may emit the same color and amount of light and, alternatively, may emit different colors and amounts of light from one another.

High beam light-emitting devices 21 through 23 are disposed farther in the lighting direction than low beam light-emitting device 11. In other words, high beam light-emitting devices 21 through 23 are more forwardly disposed than low beam light-emitting device 11 (i.e., farther in the positive direction of the Z axis). High beam light-emitting devices 21 through 23 are, for example, positioned below central axis J of low beam lens 30 and below low beam light-emitting device 11. High beam light-emitting devices 21 through 23 are thermally coupled to heat dissipator 50.

High beam light-emitting device 21 emits light that is to pass through collimating lens 41 of high beam lens 40. High beam light-emitting device 22 emits light that is to pass through collimating lens 42 of high beam lens 40. High beam light-emitting device 23 emits light that is to pass through collimating lens 43 of high beam lens 40. Light emitted through collimating lenses 41 through 43 may illuminate the same area and, alternatively, may illuminate different areas.

Substrate 24 is, for example, a ceramic substrate including, for example, alumina, a resin substrate including resin, or an insulated metal substrate including a metal base covered by a layer of insulating material. Substrate 24 has a shape in a plan view corresponding to the shape of placement surface 52 of heat dissipator 50 on which substrate 24 is placed. For example, as illustrated in FIG. 2, the plan view shape of substrate 24 is an approximate circular arc having a predetermined width.

Low Beam Lens

Low beam lens 30 is one example of a first lens that is disposed in a path of light reflected by reflector 60 and that transmits the light from reflector 60 along a predetermined lighting direction. More specifically, low beam lens 30 is a projection lens that transmits in a forward direction light emitted by low beam light source module 10.

As illustrated by the bold solid lines in FIG. 4, light emitted by low beam light source module 10 enters low beam lens 30 through the entry surface of low beam lens 30 after reflecting off reflector 60, and exits low beam lens 30 through the exit surface of low beam lens 30. Note that the entry surface is the back planar surface of low beam lens 30, and the exit surface is the front curved surface (for example, a spherical or oval spherical surface) of low beam lens 30.

In Embodiment 1, low beam lens 30 is more forwardly disposed than low beam light source module 10 and shield 70 (i.e., disposed farther in the positive direction of the Z axis). Low beam lens 30 is also more forwardly disposed than high beam lens 40. More specifically, low beam lens 30 is disposed such that the entry surface of low beam lens 30 and the exit surface (front principal surface) of high beam lens 40 are approximately flush with one another. Low beam lens 30 is disposed to overlap with shield 70 and reflector 60 in a front view. Positioning of low beam lens 30 is achieved by, for example, low beam lens 30 being fixed to heat dissipator 50.

Low beam lens 30 can be manufactured by, for example, injection molding using a light-transmissive resin such as amyl (PMMA), polycarbonate (PC), or a cyclic olefin resin. For example, low beam lens 30 is a portion of a sphere or oval sphere. More specifically, the upper portion of low beam lens 30 has the shape of a quarter slice of a sphere (one quarter of a sphere), and the lower portion has the shape of one quarter of a sphere with portions in front of high beam lens 40 (the three collimating lenses 41 through 43) removed.

High Beam Lens

High beam lens 40 is a projection lens that transmits light emitted by high beam light source module 20. High beam lens 40 is one example of a second lens disposed in a path of light from high beam light-emitting devices 21 through 23.

More specifically, high beam lens 40 is formed by grouping three collimating lenses 41 through 43 together. Each of the three collimating lenses 41 through 43 corresponds to one of high beam light-emitting devices 21 through 23. The three collimating lenses 41 through 43 convert incident light into collimated light.

Each of the three collimating lenses 41 through 43 has a truncated cone shape having a diameter that widens toward the front. High beam light-emitting devices 21 through 23 are disposed to the small diameter side of the three collimating lenses 41 through 43.

High beam lens 40 can be manufactured by, for example, injection molding using a light-transmissive resin such as acryl (PMMA), polycarbonate (PC), or a cyclic olefin resin.

In Embodiment 1, low beam lens 30 and high beam lens 40 are separate components, but low beam lens 30 and high beam lens 40 may be integrally formed. Moreover, the three collimating lenses 41 through 43 are integrally formed, but the three collimating lenses 41 through 43 may be separate components. The arrangement of the three collimating lenses 41 through 43—that is to say, the arrangement of the three high beam light-emitting devices 21 through 23—is also not limited to the example illustrated in the Drawings.

As illustrated in FIG. 3, high beam lens 40 and high beam light source module 20 are disposed on the same side of central axis J of low beam lens 30 as low beam light source module 10. More specifically, low beam light source module 10, high beam light source module 20, and high beam lens 40 are disposed below central axis J of low beam lens 30.

Moreover, high beam lens 40 and high beam light source module 20 are more forwardly disposed than shield 70. More specifically, high beam lens 40 and high beam light source module 20 are, in a side view, disposed between shield 70 and low beam lens 30.

Heat Dissipator

Heat dissipator 50 is a heat dissipating component for dissipating and releasing out (to the atmosphere) heat generated by low beam light source module 10 and high beam light source module 20. As such, heat dissipator 50 includes, for example, a material with a high rate of heat transfer, such as metal. Heat dissipator 50 is, for example, an aluminum die cast heat dissipator including composite aluminum. Heat dissipator 50 includes a plurality of heat dissipating fins.

As illustrated in FIG. 3, heat dissipator 50 includes placement surface 51 and placement surface 52.

Placement surface 51 is one outer surface (the first outer surface) of heat dissipator 50. In Embodiment 1, placement surface 51 is an outer surface exposed to the central axis J side of low beam lens 30, and more specifically is the top surface of heat dissipator 50. Placement surface 51 is, for example, a planar surface parallel to central axis J.

Low beam light-emitting device 11 is thermally coupled to placement surface 51. More specifically, low beam light source module 10 is placed on placement surface 51. Moreover, shield 70 is disposed on placement surface 51.

Placement surface 52 is one outer surface (second outer surface) of heat dissipator 50, and is a different outer surface than placement surface 51. In Embodiment 1, placement surface 52 is the front end surface of heat dissipator 50. Placement surface 52 is, for example, a planar surface perpendicular to central axis J. Placement surface 52 is approximately perpendicular to placement surface 51. Placement surface 51 and placement surface 52 share a common edge.

As illustrated in FIG. 3, heat dissipator 50 includes elongated portion 53. Elongated portion 53 extends so as to cover the side of reflector 60 opposite the reflective surface of reflector 60. More specifically, elongated portion 53 extends upward from the back end portion of heat dissipator 50. The height of elongated portion 53 (i.e., the distance between the top surface of elongated portion 53 and placement surface 51) is greater than the height from placement surface 51 to the highest point of reflector 60, for example. Stated differently, elongated portion 53 extends above reflector 60 when viewed from the front.

Heat dissipator 50 has a lengthwise direction extending from front to back. In other words, in a side view, placement surface 51 corresponds to the lengthwise portion of heat dissipator 50 and placement surface 52 corresponds to the narrow portion of heat dissipator 50, as illustrated in FIG. 3.

Reflector

Reflector 60 reflects light emitted from low beam light-emitting device 11. Reflector 60 is disposed above low beam light source module 10. The area above reflector 60 is, for example, open. In other words, when lighting apparatus 1 is viewed from above, the back surface of reflector 60 (i.e., the surface opposite the light reflective surface) is visible.

Reflector 60 includes a light reflective surface (curved reflective surface) that reflects forward light emitted upward by low beam light source module 10, such that the light is incident on low beam lens 30. More specifically, as illustrated in FIG. 3, reflector 60 includes first reflective surface 61 and second reflective surface 62.

First reflective surface 61 is the principal reflective surface of reflector 60. The light reflected by first reflective surface 61 travels toward low beam lens 30, as illustrated by the bold solid lines in FIG. 4.

First reflective surface 61 includes, for example, a portion of a spheroid. For example, in a vertical cross section of lighting apparatus 1 (the cross sections illustrated in FIG. 3 and FIG. 4), first reflective surface 61 has a shape in which a plurality of ellipses having mutually different focal points are connected. Note that one focal point of the plurality of ellipses (the first focal point of first reflective surface 61) is positioned near low beam light-emitting device 11. Another focal point of the plurality of ellipses (the second focal point of first reflective surface 61) is positioned near a focal plane of low beam lens 30. For example, an axis (a lengthwise axis) in the approximate elliptical shape of first reflective surface 61 extends in a line connecting low beam light-emitting device 11 and an edge (upper surface edge) of shield 70 in the focal plane of low beam lens 30. This axis is slanted relative to central axis J of low beam lens 30.

Second reflective surface 62 reflects light emitted from low beam light-emitting device 11 and not reflected by first reflective surface 61. As illustrated by the bold broken line in FIG. 4, light reflected by second reflective surface 62 is then reflected by reflective film 71 of shield 70 and travels toward low beam lens 30.

Reflector 60 is fixed to heat dissipator 50 such that low beam light-emitting device 11 is disposed near the first focal point. With this, light emitted from low beam light-emitting device 11 is reflected by reflector 60 and travels toward the vicinity of the second focal point.

Reflector 60 is, for example, formed by resin molding using a heat resistant resin, and a reflective film is formed on the surface of reflector 60. For example, polycarbonate (PC) can be used as the high resistant resin. Alternatively, instead of a heat resistant resin, fiber reinforced plastic (FRP) or a bulk molding compound (BMC) may be used. The reflective film is, for example, a metal deposition film such as an aluminum deposition film. The reflective film specularly reflects light emitted from low beam light-emitting device 11.

Shield

Shield 70 is one example of a shield that blocks a portion of the light reflected by reflector 60. More specifically, shield 70 is a structure that defines a predetermined cutoff line—which is a boundary between dark and light areas—by blocking a portion of light emitted by from low beam light source module 10.

As illustrated in FIG. 3, shield 70 is disposed on placement surface 51, between reflector 60 and low beam lens 30. Shield 70 is fixed to heat dissipator 50. More specifically, shield 70 is disposed such that the upper surface end in the focal plane of low beam lens 30 is approximately aligned with central axis J of low beam lens 30. In other words, shield 70 is disposed between placement surface 51 and central axis J of low beam lens 30.

Shield 70 is, for example, formed using a heat resistant resin or fiber reinforced plastic, similar to reflector 60. The surface of shield 70 nearest low beam lens 30 has a reflective film formed thereon. For example, as illustrated in FIG. 3, shield 70 includes reflective film 71.

Reflective film 71 directs light toward low beam lens 30 by reflecting light reflected by second reflective surface 62 of reflector 60. Reflective film 71 is, for example, a metal deposition film such as an aluminum deposition film.

Reflective film 71 has, for example, a curved reflective surface. As illustrated by the bold broken line in FIG. 4, the light reflected by reflective film 71 and subsequently transmitted by low beam lens 30 is widely emitted forward and in a direction pointing above the horizon line.

Note that shield 70 may include metal instead of resin. Shield 70 may also be integrally formed with heat dissipator 50.

Advantageous Effects, Etc.

As described above, lighting apparatus 1 according to Embodiment 1 is to be installed on automobile 100 and includes: heat dissipator 50 having placement surface 51 and placement surface 52 different from placement surface 51; low beam light-emitting device 11 thermally coupled to placement surface 51 of heat dissipator 50; high beam light-emitting devices 21 through 23 thermally coupled to placement surface 52 of heat dissipator 50; reflector 60 that reflects light emitted from low beam light-emitting device 11; low beam lens 30 that is disposed in a path of light reflected by reflector 60 and that transmits the light from reflector 60 along a predetermined lighting direction; and high beam lens 40 disposed in a path of light from high beam light-emitting devices 21 through 23. Moreover, for example, automobile 100 according to Embodiment 1 includes lighting apparatus 1 installed in the front portion of vehicle body 110.

With this configuration, low beam light-emitting device 11 and high beam light-emitting devices 21 through 23 are disposed on a single heat dissipator 50. In other words, lighting apparatus 1 according to Embodiment 1 is a lamp that is a single unit that can emit a low beam and a high beam. Therefore, compared to when separate lamps for low beam use and high beam use are required, the design freedom of automobile 100 can be greatly increased.

Moreover, for example, lighting apparatus 1 further includes shield 70 that is disposed on placement surface 51, between reflector 60 and low beam lens 30, and blocks a portion of the light reflected by reflector 60.

With this configuration, for example, light traveling toward the oncoming traffic lane can be blocked by shield 70, which makes it possible to reduce glare for oncoming traffic.

Moreover, for example, high beam light-emitting devices 21 through 23 and high beam lens 40 are disposed on the same side of central axis J of low beam lens 30 as low beam light-emitting device 11.

With this configuration, for example, low beam light-emitting device 11 and high beam light-emitting devices 21 through 23 can be closely disposed, which makes it possible to achieve a compact heat dissipator 50. This in turn makes it possible to achieve a compact lighting apparatus 1.

Moreover, for example, heat dissipator 50 extends to cover the side of reflector 60 opposite the reflective surface of reflector 60.

With this configuration, the cubic measure of heat dissipator 50 can be increased, which makes it possible to effectively dissipate heat. Moreover, as a result of heat dissipator 50 including elongated portion 53, the center of mass of lighting apparatus 1 can be moved farther rearward compared to when elongated portion 53 is not included. Thus, for example, it possible to stabilize lighting apparatus 1 by fixing lighting apparatus 1 to vehicle body 110 at a forward portion of lighting apparatus 1.

Moreover, for example, heat dissipator 50, low beam light-emitting device 11, high beam light-emitting devices 21 through 23, reflector 60, low beam lens 30, and high beam lens 40 form a unit that fits within a predetermined circular region when viewed from the lighting direction.

With this configuration, low beam light-emitting device 11, low beam lens 30, high beam light-emitting devices 21 through 23, and high beam lens 40 can be formed as a unit, which makes it possible to achieve a compact lighting apparatus 1.

Moreover, for example, low beam light-emitting device 11 and high beam light-emitting devices 21 through 23 are LEDs.

With this configuration, power consumption can be reduced as a result of using LEDs.

Embodiment 2

Next, the lighting apparatus according to Embodiment 2 will described.

The conventional lighting apparatus described in the background section includes a protrusion acting as a shield that blocks a portion of the light reflected from a reflector in order to reduce glare for the oncoming traffic lane. As a result, a portion of the light emitted by the light-emitting device is blocked by the protrusion acting as a shield and not emitted forward. In other words, with the conventional lighting apparatus, light emitted by the light-emitting device cannot be effectively used for illumination purposes, and thus has a low lighting efficiency.

In view of this, a first object of the present disclosure is to provide a lighting apparatus which can achieve a further increase in lighting efficiency and a mobile object including the lighting apparatus.

In order to achieve the above described first object, a lighting apparatus according to Embodiment 2 is a lighting apparatus to be installed on a mobile object, and includes: a light-emitting device, a reflector that reflects light emitted from the light-emitting device; a lens disposed in a path of light reflected by the reflector; and a light guiding component disposed between the reflector and the lens. The light guiding component changes a traveling direction of the light from the reflector to guide the light to the lens.

According to Embodiment 2, lighting efficiency can be further increased.

The conventional lighting apparatus described in the background section reflects light emitted from the light-emitting device at the front end portion (the portion toward the lens) of the reflector in order to emit light for illuminating an upward area in front of the vehicle. As such, the reflector includes a large reflective surface for reflecting a greater portion of the light emitted from the light-emitting device. In other words, since the size of the reflector is increased, the size of the structure for supporting the reflector is also increased, thereby increasing the overall size of the lighting apparatus.

In view of this, a second object of the present disclosure is to provide a compact lighting apparatus and a mobile object including the lighting apparatus.

In order to achieve the above described second object, a lighting apparatus according to Embodiment 2 is a lighting apparatus to be installed on a mobile object and includes: a first light-emitting device; a first heat dissipator thermally coupled to the first light-emitting device; a first reflector that reflects light emitted from the first light-emitting device; a lens that is disposed in a path of light reflected by the first reflector and that transmits the light from the first reflector along a predetermined lighting direction; a second light-emitting device disposed further in the lighting direction than the first light-emitting device; and a second heat dissipator thermally coupled to the second light-emitting device and disposed so that the first reflector is between the first heat dissipator and the second heat dissipator. The second heat dissipator includes: an extension portion extending along the lighting direction beyond the first reflector; and reflective portion that is fixed to the extension portion and reflects light emitted from the first light-emitting device and not reflected by the first reflector.

According to Embodiment 2, it is possible to provide a compact lighting apparatus and an automobile including the lighting apparatus.

Lighting Apparatus

Next, lighting apparatus 1A according to Embodiment 2 will be described with reference to FIG. 5 through FIG. 9.

Figure 5:
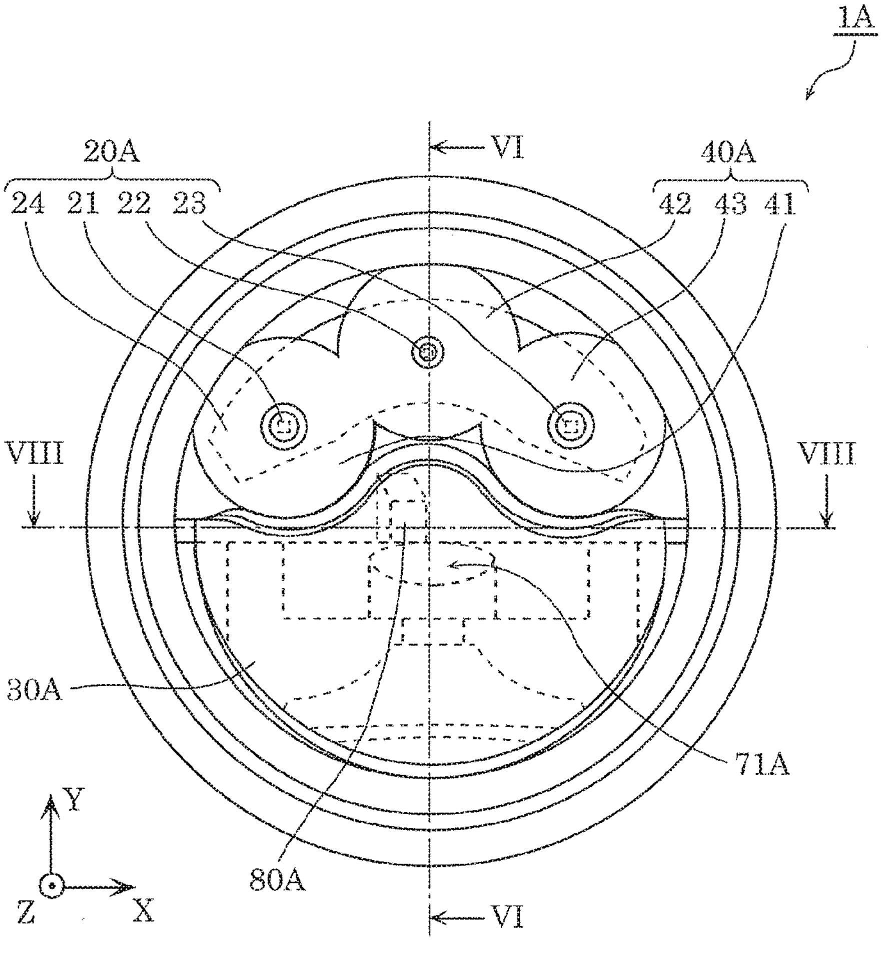
FIG. 5 is a front view of a lighting apparatus according to Embodiment 2 of the present disclosure.
Figure 6:
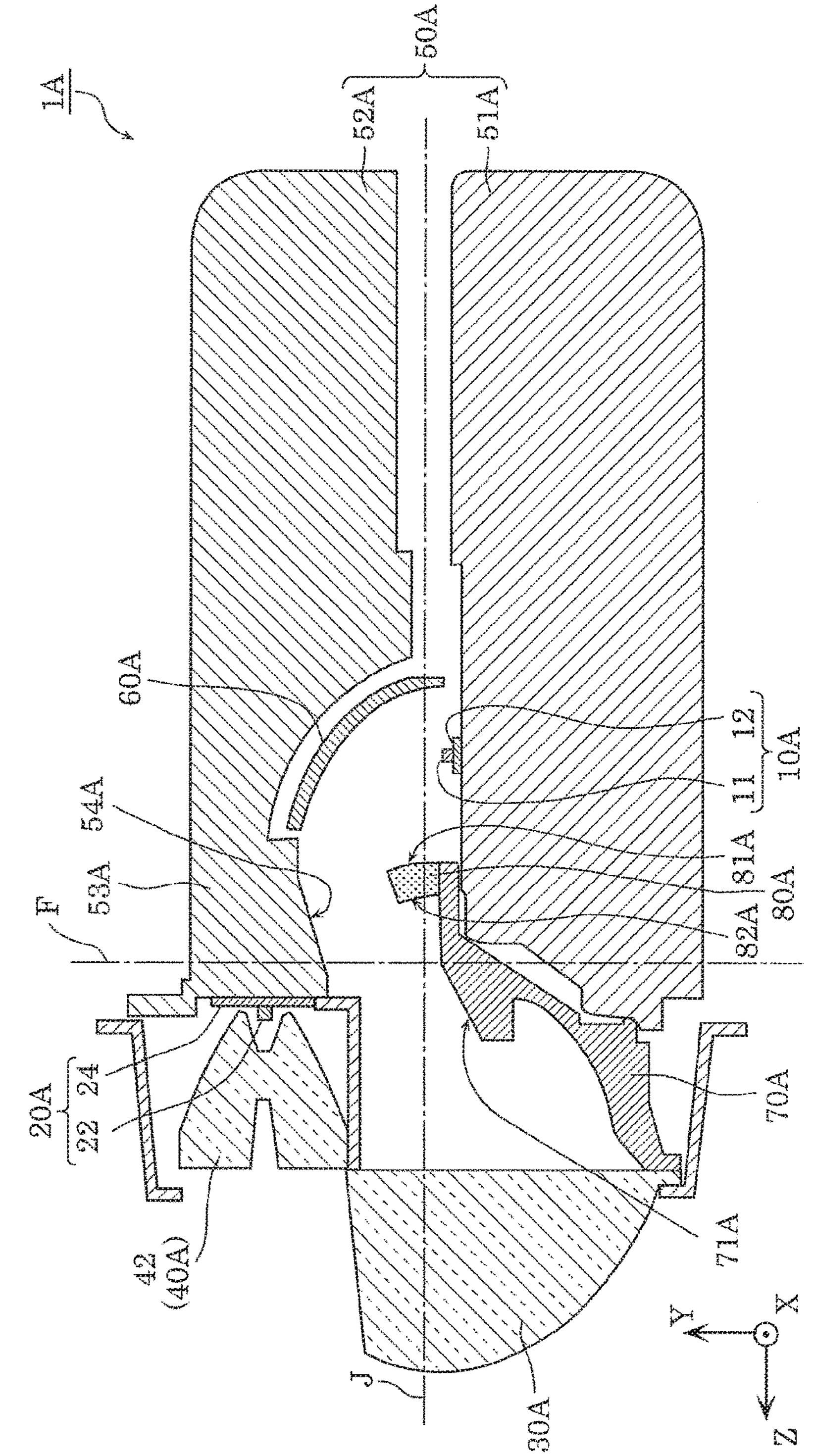
FIG. 6 is a cross sectional view of a lighting apparatus according to Embodiment 2 of the present disclosure, taken along line VI-VI in FIG. 5.

FIG. 5 is a front view of lighting apparatus 1A according to Embodiment 2. FIG. 6 is a cross sectional view of lighting apparatus 1A according to Embodiment 2, taken along line VI-VI in FIG. 5. More specifically, FIG. 6 is vertical cross section taken down the center of lighting apparatus 1A.

Figure 7:
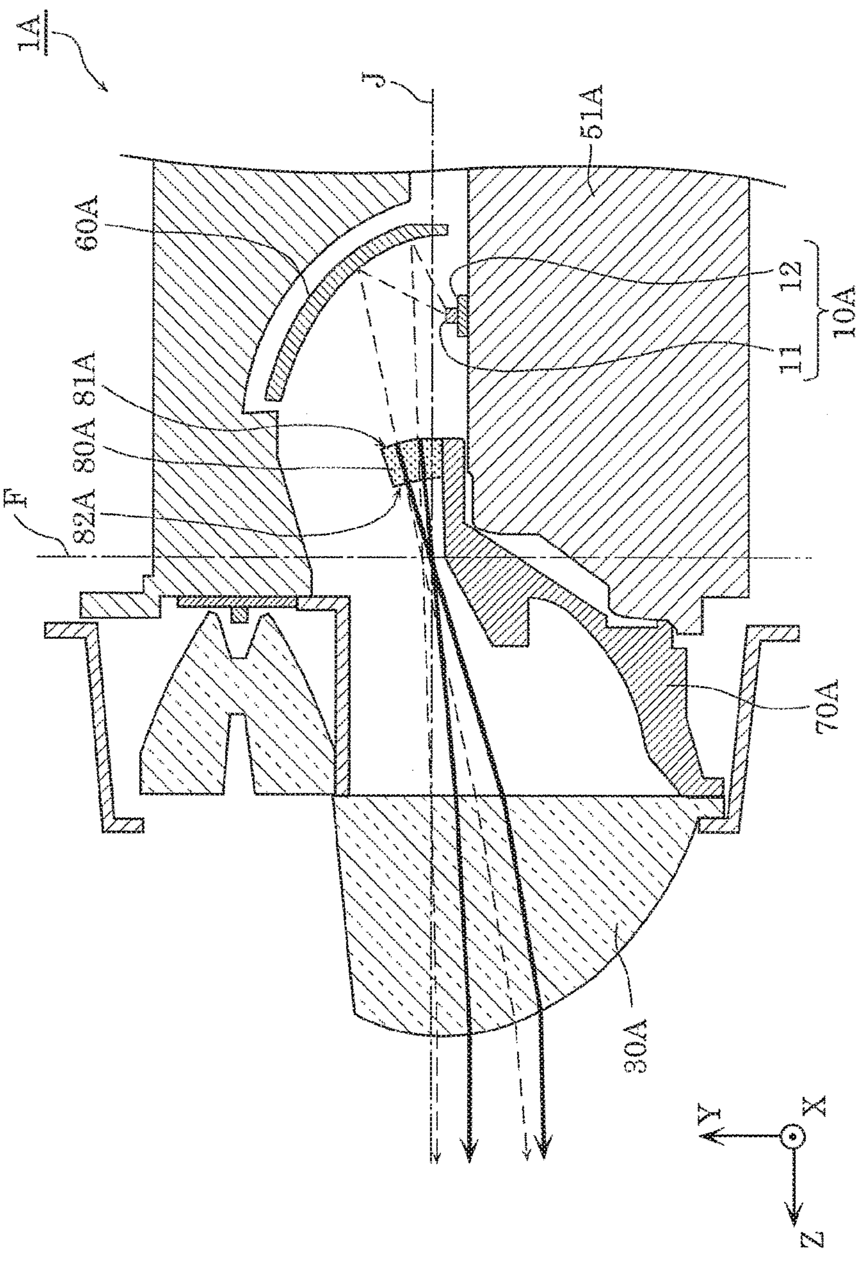
FIG. 7 is a cross sectional view of a lighting apparatus according to Embodiment 2 of the present disclosure, taken along line VI-VI in FIG. 5, and illustrates paths of light passing through a protrusion.
Figure 8:
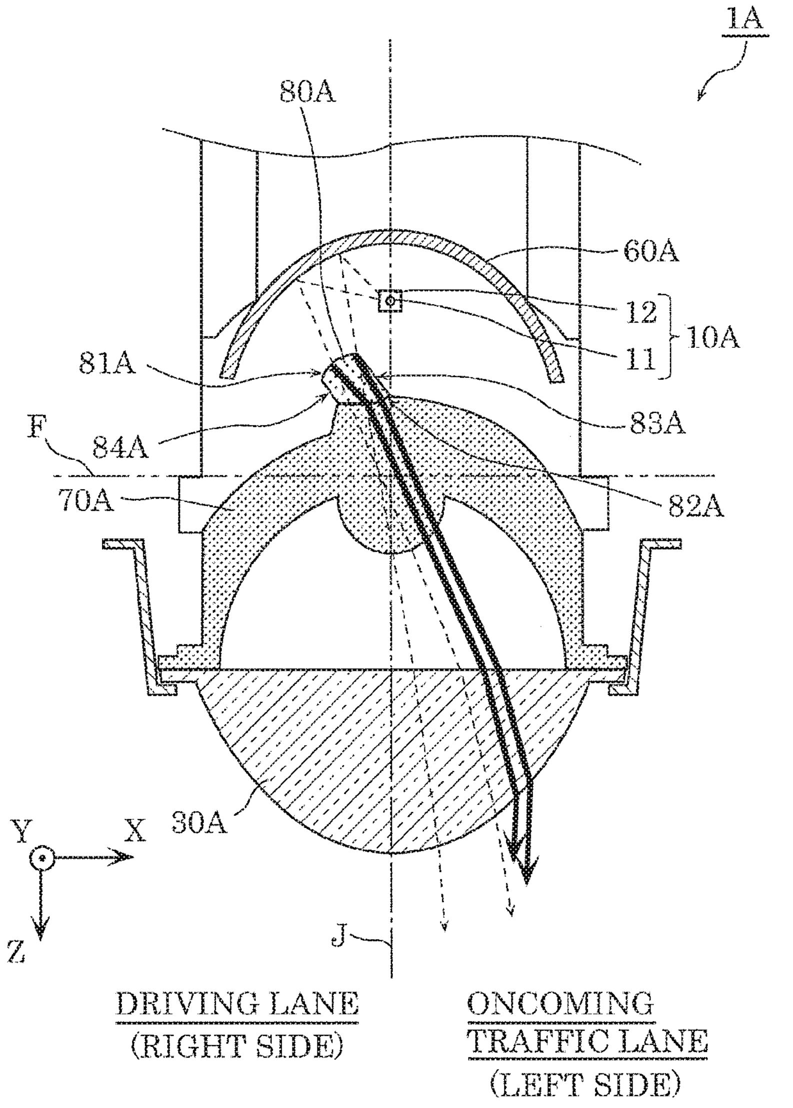
FIG. 8 is a cross sectional view of a lighting apparatus according to Embodiment 2 of the present disclosure, taken along line VII-VII in FIG. 5, and illustrates paths of light passing through a protrusion.
Figure 9:
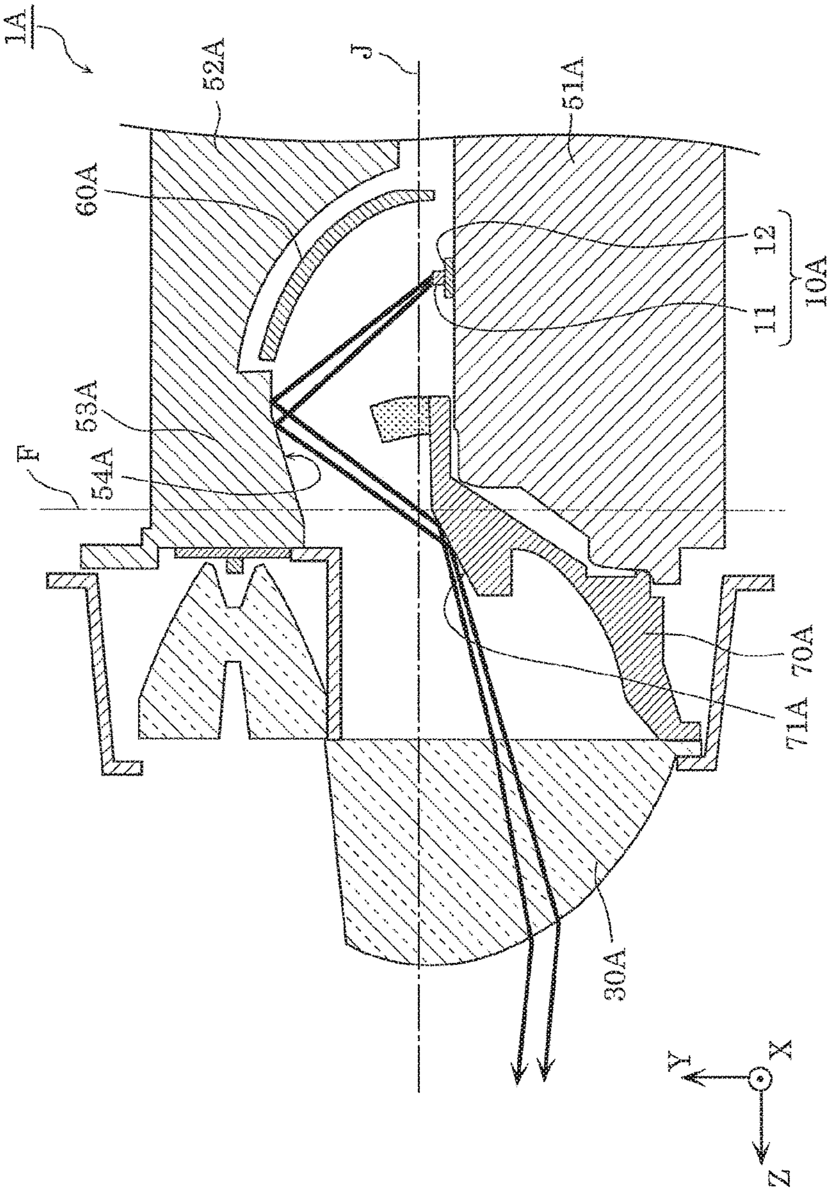
FIG. 9 is a cross sectional view of a lighting apparatus according to Embodiment 2 of the present disclosure, taken along line VI-VI in FIG. 5, and illustrates paths of light reflected by a reflective portion.

FIG. 7 is a cross sectional view of lighting apparatus 1A according to Embodiment 2, taken along line VI-VI in FIG. 5, and illustrating paths of light passing through protrusion 80A. FIG. 8 is a cross sectional view of lighting apparatus 1A according to Embodiment 2, taken along line VII-VII in FIG. 5, and illustrating paths of light passing through protrusion 80A. FIG. 9 is a cross sectional view of lighting apparatus 1A according to Embodiment 2, taken along line VI-VI in FIG. 5, and illustrating paths of light reflected by reflective portion 54A.

Note that in FIG. 7 and FIG. 8, the bold solid line arrows indicate the paths of light passing through protrusion 80A according to Embodiment 2. The thin broken line arrows are provided as a comparative example of paths of light when protrusion 80A according to Embodiment 2 is not provided. Moreover, in FIG. 8, the vertically drawn dotted and dashed line is central axis J of low beam lens 30A. Central axis J passes through the approximate center of lighting apparatus 1A.

Similar to lighting apparatus 1 according to Embodiment 1, lighting apparatus 1A according to Embodiment 2 is installed on a mobile object. Lighting apparatus 1A is, for example, attached to automobile 100 illustrated in FIG. 1. In other words, automobile 100 may include, in the front of vehicle body 110, lighting apparatus 1A according to Embodiment 2 instead of lighting apparatus 1 according to Embodiment 1.

As illustrated in FIG. 5 and FIG. 6, lighting apparatus 1A includes, as the main body of the lamp, low beam light source module 10A, high beam light source module 20A, low beam lens 30A, high beam lens 40A, heat dissipator 50A, reflector 60A, shield 70A, and protrusion 80A. Although not illustrated in the Drawings, lighting apparatus 1A further includes a lighting controller that controls low beam light source module 10A and high beam light source module 20A.

As illustrated in FIG. 5, lighting apparatus 1A is configured to fit within a predetermined circular region when viewed from the lighting direction (i.e., when viewed along the Z axis). More specifically, low beam light source module 10A, high beam light source module 20A, low beam lens 30A, high beam lens 40A, heat dissipator 50A, reflector 60A, shield 70A, and protrusion 80A form a unit that fits within a predetermined circular region when viewed along the Z axis. The predetermined circular region is, for example, φ 70 mm (in diameter).

Hereinafter, each element of lighting apparatus 1A will be described in detail. Note that description of configurations that are the same as in Embodiment 1 are omitted or condensed.

Low Beam Light Source Module

Similar to low beam light source module 10 according to Embodiment 1, low beam light source module 10A is one example of a first light source that emits light for short-distance illumination. As illustrated in FIG. 6, low beam light source module 10A is fixed to first heat sink 51A of heat dissipator 50A. In other words, low beam light source module 10A is different from Embodiment 1 in regard to arrangement, and the same as low beam light source module 10 in regard to structure, for example.

More specifically, substrate 12 is placed on and fixed to a predetermined placement surface of first heat sink 51A. In Embodiment 2, substrate 12 is disposed lying down (i.e., disposed horizontally) so low beam light source module 10A emits light upward, as illustrated in FIG. 6. In other words, the optical axis of low beam light source module 10A (low beam light-emitting device 11) is parallel to the Y axis.

In Embodiment 2, low beam light-emitting device 11 is thermally coupled to first heat sink 51A. Substrate 12 has a shape in a plan view corresponding to the shape of placement surface of first heat sink 51A on which substrate 12 is placed.

High Beam Light Source Module

Similar to high beam light source module 20 according to Embodiment 1, high beam light source module 20A is one example of a second light source that emits light for long-distance illumination. As illustrated in FIG. 6, high beam light source module 20A is fixed to second heat sink 52A of heat dissipator 50A. In other words, high beam light source module 20A is different from Embodiment 1 in regard to arrangement, and the same as high beam light source module 20 in regard to structure, for example.

More specifically, substrate 24 is placed on and fixed to a predetermined placement surface of second heat sink 52A. In Embodiment 2, substrate 24 is disposed standing up (i.e., disposed vertically) so high beam light source module 20A emits light forward, as illustrated in FIG. 6. In other words, the optical axis of high beam light source module 20A (high beam light-emitting devices 21 through 23) is parallel to the Z axis.

In Embodiment 2, high beam light-emitting devices 21 through 23 are thermally coupled to second heat sink 52A. Substrate 24 has a shape in a plan view corresponding to the shape of placement surface of second heat sink 52A on which substrate 24 is placed. For example, as illustrated in FIG. 5, the plan view shape of substrate 24 is an approximate circular arc having a predetermined width.

Low Beam Lens

Similar to low beam lens 30 according to Embodiment 1, low beam lens 30A is one example of a first lens that is disposed in a path of light reflected by reflector 60A and that transmits the light from reflector 60A along a predetermined lighting direction.

In Embodiment 2, positioning of low beam lens 30A is achieved by, for example, low beam lens 30A being fixed to shield 70A (or first heat sink 51A). Moreover, in Embodiment 2, the lower portion of low beam lens 30A has the shape of a quarter slice of a sphere (one quarter of a sphere), and the upper portion has the shape of one quarter of a sphere with portions in front of high beam lens 40A (the three collimating lenses 41 through 43) removed.

Low beam lens 30A projects a light source image formed on focal plane F as an inverted, image on a virtual vertical screen in front of low beam lens 30A. In other words, low beam lens 30A inversely projects a light source image (a distribution of light) formed on focal plane F, which is light emitted by low beam light-emitting device 11. Note that focal plane F is a plane including the rearward focal point of low beam lens 30A, and more specifically is the focal plane on the reflector 60A side of low beam lens 30A. Focal plane F is, for example, located near a focal point (the second focal point) of reflector 60A.

High Beam Lens

High beam lens 40A is a projection lens that transmits light emitted by high beam light source module 20A. Similar to high beam lens 40 according to Embodiment 1, high beam lens 40A is one example of a second lens disposed in a path of light from high beam light-emitting devices 21 through 23.

In Embodiment 2, high beam lens 40A and high beam light source module 20A are disposed on the same side of central axis J of low beam lens 30A as low beam light source module 10A, as illustrated in FIG. 6. More specifically, high beam lens 40A and high beam light source module 20A are disposed above central axis J of low beam lens 30A.

Heat Dissipator

Similar to heat dissipator 50 according to Embodiment 1, heat dissipator 50A is a heat dissipating component for dissipating and releasing out (to the atmosphere) heat generated by low beam light source module 10A and high beam light source module 20A. As such, heat dissipator 50A includes, for example, a material with a high rate of heat transfer, such as metal.

As illustrated in FIG. 6, heat dissipator 50A is divided into two heat sinks—first heat sink 51A and second heat sink 52A. In other words, first heat sink 51A and second heat sink 52A are combined such that heat dissipator 50A is an integral unit. First heat sink 51A and second heat sink 52A each include a plurality of heat dissipating fins. First heat sink 51A and second heat sink 52A are aluminum die cast heat sinks including composite aluminum, for example.

First heat sink 51A is a first heat dissipator thermally coupled to low beam light-emitting device 11. First heat sink 51A is principally a heat dissipating component for dissipating heat generated by low beam light source module 10A (low beam light-emitting device 11). First heat sink 51A includes a placement surface (installation surface) for placing low beam light source module 10A.

Second heat sink 52A is a second heat dissipator thermally coupled to high beam light-emitting devices 21 through 23. Second heat sink 52A is principally a heat dissipating component for dissipating heat generated by high beam light source module 20A (high beam light-emitting devices 21 through 23). Second heat sink 52A includes a placement surface (installation surface) for placing high beam light source module 20A.

Second heat sink 52A is disposed so as to sandwich reflector 60A between first heat sink 51A and second heat sink 52A. In Embodiment 2, a space is formed between first heat sink 51A and second heat sink 52A where low beam light source module 10A, reflector 60A, and protrusion 80A are disposed, as illustrated in FIG. 6.

As illustrated in FIG. 6, second heat sink 52A includes extension portion 53A and reflective portion 54A.

Extension portion 53A is a section of second heat sink 52A, and extends in the lighting direction beyond the end of reflector 60A located in the lighting direction (i.e., the end located in the positive direction of the X axis). More specifically, extension portion 53A is the section of second heat sink 52A that is positioned in front of the front end of reflector 60A. Extension portion 53A is not covered by reflector 60A and is exposed to low beam light source module 10A. As illustrated in FIG. 6, extension portion 53A is disposed directly above and covers protrusion 80A and a portion of shield 70A (the back portion).

The front end surface of extension portion 53A is a placement surface for placing high beam light source module 20A. In other words, high beam light-emitting devices 21 through 23 are thermally coupled to extension portion 53A.

Reflective portion 54A reflects light emitted from low beam light-emitting device 11 and not reflected by reflector 60A. Reflective portion 54A has, for example, a curved reflective surface. Light reflected by reflective portion 54A travels toward reflective film 71A of shield 70A, as illustrated in FIG. 9. More specifically, the light reflective surface of reflective portion 54A (the curved reflective surface) includes a portion of a spheroid.

Reflective portion 54A is fixed to extension portion 53A. In Embodiment 2, reflective portion 54A is a reflective film integrally formed with extension portion 53A.

For example, reflective portion 54A is a reflective film formed on the bottom surface of extension portion 53A (the surface on the same side as low beam light-emitting device 11) by white anodizing the aluminum, white coating, or deposition of a thin metal film. In other words, reflective portion 54A is, for example, a white anodized film formed on the bottom surface of extension portion 53A, a white resist film coated on the bottom surface of extension portion 53A, or an aluminum deposition film deposited on the bottom surface of extension portion 53A. Reflective portion 54A may be formed by treating the bottom surface of extension portion 53A to have a specular surface.

Reflector

Reflector 60A is one example of a first reflector that reflects light emitted from low beam light-emitting device 11. Reflector 60A is disposed in heat dissipator 50A, above low beam light source module 10A. Reflector 60A includes a light reflective surface (curved reflective surface) that reflects diagonally forward and downward light emitted upward by low beam light source module 10A, such that the light is incident on low beam lens 30A.

In Embodiment 2, the light reflective surface of reflector 60A (the surface that opposes low beam light-emitting device 11) includes a portion of a spheroid. For example, in a vertical cross section of lighting apparatus 1A (the cross sections illustrated in FIG. 6), reflector 60A has a shape in which a plurality of ellipses having mutually different focal points are connected. Note that one focal point of each of the plurality of ellipses (the first focal point of reflector 60A) is located near low beam light-emitting device 11. Another focal point of the plurality of ellipses (the second focal point of reflector 60A) is located near focal plane F of low beam lens 30A. For example, an axis (a lengthwise axis) in the approximate elliptical shape of reflector 60A extends in a line connecting low beam light-emitting device 11 and an edge (upper surface edge) of shield 70A in focal plane F of low beam lens 30A.

Reflector 60A is fixed to first heat sink 51A of heat dissipator 50A such that low beam light-emitting device 11 is disposed near the first focal point. With this, light emitted from low beam light-emitting device 11 is reflected by reflector 60A and travels toward the vicinity of the second focal point.

Reflector 60A is, for example, formed by resin molding using a heat resistant resin, and a reflective film is formed on the surface of reflector 60A. For example, polycarbonate (PC) can be used as the high resistant resin. Alternatively, instead of a heat resistant resin, fiber reinforced plastic (FRP) or a hulk molding compound (BMC) may be used. The reflective film is, for example, a metal deposition film such as an aluminum deposition film. The reflective film specularly reflects light emitted from low beam light-emitting device 11.

Shield

Shield 70A is one example of a shield that blocks a portion of the light reflected by reflector 60A. More specifically, shield 70A is a structure that defines a predetermined cutoff line—which is a boundary between dark and light areas—by blocking a portion of light emitted by low beam light source module 10A.

Shield 70A is disposed between reflector 60A and low beam lens 30A. More specifically, shield 70A is fixed to first heat sink 51A.

Shield 70A is, for example, formed using a heat resistant resin or fiber reinforced plastic, similar to reflector 60A. The surface of shield 70A nearest low beam lens 30A has a reflective film formed thereon. For example, as illustrated in FIG. 6, shield 70A includes reflective film 71A.

Reflective film 71A is one example of a second reflector disposed on shield 70A. Reflective film 71A directs light toward low beam lens 30A by reflecting light reflected by reflective portion 54A. Reflective film 71A is, for example, a metal deposition film such as an aluminum deposition film.

Reflective film 71A has, for example, a curved reflective surface. As illustrated in FIG. 9, after passing through low beam lens 30A, the light reflected by reflective film 71A is widely emitted forward and in a direction pointing above the horizon line.

Note that shield 70A may include metal instead of resin. Shield 70A may also be integrally formed with first heat sink 51A.

Protrusion (Light Guiding Component)

Protrusion 80A is one example of a light guiding component disposed between reflector 60A and low beam lens 30A. Protrusion 80A protrudes upward from the ceiling (top surface) of shield 70A. More specifically, protrusion 80A protrudes upward above the optical axis of low beam lens 30A. Note that in FIG. 6, the axis of low beam lens 30A extends in a line connecting a point where central axis J intersects the entry surface of low beam lens 30A and an edge (upper surface edge) of shield 70A in focal plane F of low beam lens 30A.

As illustrated in FIG. 6, protrusion 80A is disposed between focal surface F of low beam lens 30A and reflector 60A. More specifically, protrusion 80A is disposed between the position of the second focal point of reflector 60A and reflector 60A.

As illustrated in FIG. 8, protrusion 80A is disposed in a position offset from central axis J of low beam lens 30A . . . . In Embodiment 2, protrusion 80A is offset to the driving lane side (right side) of central axis J.

As illustrated in FIG. 7 and FIG. 8, protrusion 80A includes entry surface 81A and exit surface 82A. Protrusion 80A changes the direction of travel of light reflected by reflector 60A and entering through entry surface 81A, and transmits the light through exit surface 82A toward low beam lens 30A. More specifically, protrusion 80A changes the direction of travel of light entering through entry surface 81A such that the light is transmitted to the driving lane side of the road. Moreover, protrusion 80A changes the direction of travel of light entering through entry surface 81A such that an area farther ahead is illuminated.

As illustrated in FIG. 7 and FIG. 8, entry surface 81A has a convex surface protruding toward reflector 60A. As illustrated in FIG. 7 and FIG. 8, exit surface 82A has a concave surface receding toward reflector 60A. Entry surface 81A and exit surface 82A include, for example, a portion of a spheroid.

For example, entry surface 81A and exit surface 82A are vertically slanted (i.e., slanted relative to the Y axis), as illustrated in FIG. 7. More specifically, entry surface 81A and exit surface 82A are slanted such that the top end is positioned farther forward than the bottom end (the portion connected to the ceiling shield 70A). In other words, protrusion 80A protrudes upward from the ceiling of shield 70A and diagonally forward.

As illustrated in FIG. 8, protrusion 80A includes side surface 83A and side surface 84A. Side surface 83A and side surface 84A are the side surfaces between entry surface 81A and exit surface 82A, and are parallel to the optical axis of low beam light-emitting device 11. More specifically, side surface 83A and side surface 84A are planar surfaces parallel to the Y axis. In other words, side surface 83A and side surface 84A are disposed perpendicular to the ceiling of shield 70A. For example, side surface 83A and side surface 84A are elliptical or circular arcs having a predetermined width.

As illustrated in FIG. 8, side surface 83A and side surface 84A are slanted relative to central axis J. More specifically, side surface 83A and side surface 84A are slanted such that the distal end (the end where entry surface 81A is located) is distanced farther from central axis J than the proximal end (the end where exit surface 82A is located).

Protrusion 80A includes a light-transmissive resin material. In Embodiment 2, protrusion 80A is integrally formed with shield 70A. Thus, protrusion 80A and shield 70A include the same material, such as a heat resistant resin or fiber resistant plastic.

Note that, as described above, although shield 70A has a reflective film formed on the surface, a reflective film is not formed on protrusion 80A. More specifically, a reflective film is not formed on entry surface 81A, and a reflective film is not formed on exit surface 82A.

Light Passing Through Protrusion

Next, paths of light passing through protrusion 80A according to Embodiment 2 will be described with reference to FIG. 7 and FIG. 8.

Light emitted upward by low beam light-emitting device 11 is reflected by reflector 60A and travels forward. As illustrated in FIG. 7 and FIG. 8, a portion of the light reflected by reflector 60A (thin broken lines) enters protrusion 80A through entry surface 81A of protrusion 80A. Light incident on protrusion 80A travels into protrusion 80A, exits through exit surface 82A, and travels toward low beam lens 30A.

Here, the difference in the refractive index of protrusion 80A and the surrounding area (air) causes the light to refract. For example, the refractive index of protrusion 80A is approximately 1.48 to 1.60, inclusive. With this, the light exiting through exit surface 82A of protrusion 80A travels more downward compared to when protrusion 80A is omitted, as illustrated in FIG. 7. In other words, protrusion 80A changes the direction of travel of light entering through entry surface 81A to a more downward direction, and transmits the light through exit surface 82A.

Thus, in focal plane of low beam lens 30A, light that has passed through protrusion 80A (indicated by the hold solid lines) travels below the path that the light would travel if protrusion 80A were not provided (indicated by the thin broken lines). Low beam lens 30A inversely projects the distribution of light passing through focal plane F, so light passing below a predetermined line in focal plane F passes above the line in front of low beam lens 30A.

More specifically, light exiting exit surface 82A and transmitted by low beam lens 30A travels below and approximately perpendicular to central axis J in a side view, as illustrated in FIG. 7. Here, light exiting through exit surface 82A (indicated by the bold solid lines) is transmitted in a direction more approximate to central axis J than the direction that the light would be transmitted, in if protrusion 80A were not provided (indicated by the thin broken lines)—that is to say, is transmitted in a direction that is more horizontal. Thus, light passing through protrusion 80A according to Embodiment 2 can illuminate an area farther ahead than when protrusion 80A is not provided. In this way, according to Embodiment 2, light that would illuminate an area near vehicle body 110 can be directed farther ahead as a result of protrusion 80A refracting light. This makes it possible to achieve an increase in lighting efficiency.

Note that light traveling in a downward direction as in the case when protrusion 80A is not provided (i.e., the direction of light indicated by the thin broken lines) illuminates an area near automobile 100. In this case, when the area near automobile 100 is excessively illuminated, areas far away from automobile 100 and areas to the sides of automobile 100 appear dark. In contrast, according to Embodiment 2, protrusion 80A makes it possible to direct light that would illuminate an area near automobile 100 farther ahead. With this, a more comfortable driving environment can be created for the driver, which contributes to safer driving.

Moreover, as illustrated in FIG. 8, the light exiting through exit surface 82A of protrusion 80A travels more toward the oncoming traffic lane than when protrusion 80A is not provided. In other words, protrusion 80A changes the direction of travel of light entering through entry surface 81A to a direction more toward the oncoming traffic lane (more to the left), and transmits the light through exit surface 82A. More specifically, in focal plane F of low beam lens 30A, light transmitted through protrusion 80A (indicated by the bold solid lines) travels in a direction more toward the oncoming traffic lane (more to the left) than the direction that the light would travel in if protrusion 80A were not provided (indicated by the thin broken lines).

Light exiting through exit surface 82A and transmitted by low beam lens 30A intersects central axis J in a top view, as illustrated in FIG. 8. In other words, light exiting through exit surface 82A is transmitted toward the driving lane.

In this way, according to Embodiment 2, as a result of protrusion 80A refracting light, light that would illuminate the oncoming traffic lane can be directed to the driving line (i.e., the lane in which the driver drives his or her own vehicle). This makes it possible to achieve an increase in lighting efficiency.

Light Reflected by Reflective Portion

Next, paths of light reflected by reflective portion 54A according to Embodiment 2 will be described with reference to FIG. 9.

As illustrated in FIG. 9, a portion of light emitted from low beam light-emitting device 11 is reflected by reflective portion 54A rather than reflector 60A. Light reflected by reflective portion 54A is further reflected by reflective film 71A of shield 70A and travels toward low beam lens 30A. Moreover, light reflected by reflective film 71A and transmitted by low beam lens 30A intersects central axis J in a side view, as illustrated in FIG. 9. In other words, light reflected by reflective portion 54A and reflective film 71A illuminates an area above the horizon plane. This makes it possible to illuminate, for example, signs on the shoulder of the road or above the road. With this, a more comfortable driving environment can be created for the driver.

First Advantageous Effect, Etc.

As described above, lighting apparatus 1A according to Embodiment 2 is to be installed on automobile 100 and includes: low beam light-emitting device 11; reflector 60A that reflects light emitted from low beam light-emitting device 11; low beam lens 30A that is disposed in a path of light reflected by reflector 60A and that transmits light from reflector 60A along a predetermined lighting direction; and protrusion 80A disposed between reflector 60A and low beam lens 30A. Protrusion. 80A includes entry surface 81A and exit surface 82A, changes a direction of travel of light reflected by reflector 60A and entering through entry surface 81A, and transmits the light through exit surface 82A toward low beam lens 30A. Moreover, for example, automobile 100 according to Embodiment 2 includes lighting apparatus 1A installed in the front portion of vehicle body 110.

Figure 10:
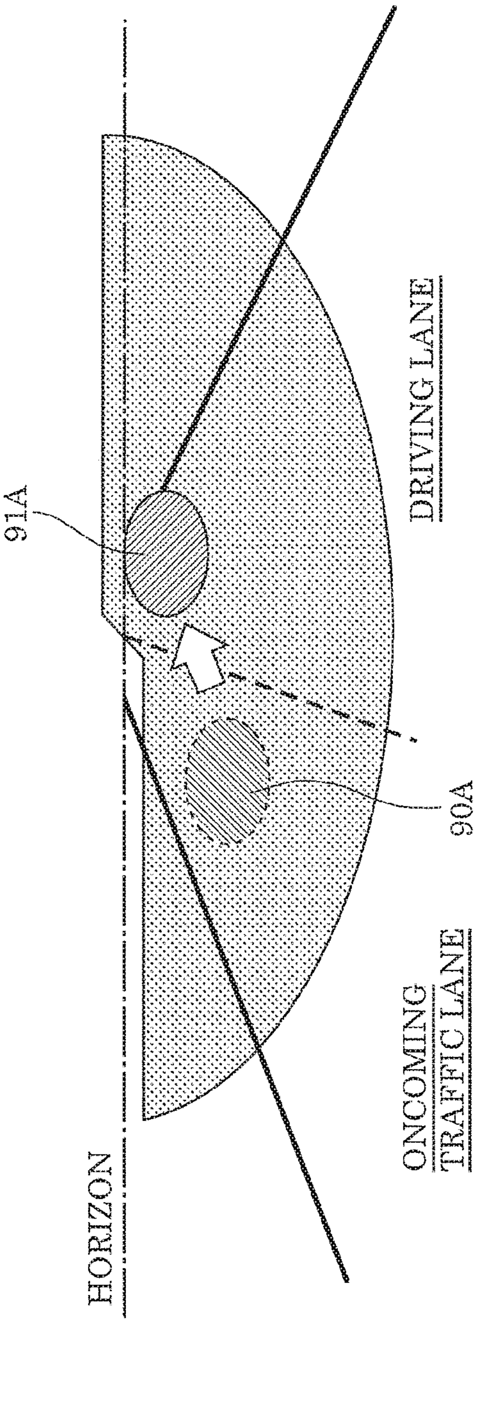
FIG. 10 illustrates a change in the direction of travel of light caused by a protrusion according to Embodiment 2 of the present disclosure.

FIG. 10 illustrates the change in the direction of travel of light caused by protrusion 80A according to Embodiment 2. In FIG. 10, the region shaded with dots is the area illuminated by tight emitting from low beam lenses 30A (i.e., the area illuminated by the low beams).

As described above, protrusion 80A changes the direction of travel of light that would illuminate the oncoming traffic lane if protrusion 80A were omitted, to a direction more toward the driving lane and farther away. In other words, as illustrated in FIG. 10, protrusion 80A changes the direction of travel of light illuminating region 90A so that the light illuminates region 91A. With this, region 91A can be brightly illuminated instead of reducing the brightness of region 90A.

In this way, for example, the light-transmissive protrusion 80A can change the conventional direction of travel of light traveling toward the oncoming traffic lane to a direction toward the driving lane (i.e., the lane in which the driver drives his or her own vehicle), and thereby brighten the driving lane. Thus, since this makes it possible to efficiently use light, it is possible to achieve an increase in lighting efficiency.

Moreover, for example, protrusion 80A is disposed between reflector 60A and focal plane F located on the same side of low beam lens 30A as reflector 60A.

With this configuration, the distance between protrusion 80A and low beam lens 30A can be increased, and therefore the direction of travel of light can be changed to a greater degree.

Moreover, for example, protrusion 80A is disposed in a position offset from central axis J of low beam lens 30A.

With this configuration, for example, the conventional direction of travel of light traveling toward the oncoming traffic lane can be changed to a direction toward the driving lane, and thereby brighten the driving lane.

Moreover, for example, entry surface 81A has a convex surface protruding toward reflector 60A, and exit surface 82A has a concave surface receding toward reflector 60A.

Moreover, for example, protrusion 80A includes side surface 83A and side surface 84A which are side surfaces between entry surface 81A and exit surface 82A, are parallel to the optical axis of low beam light-emitting device 11, and are slanted relative to central axis J of low beam lens 30A.

Moreover, for example, light exiting through exit surface 82A and transmitted by low beam lens 30A intersects central axis J in a top view, as illustrated in FIG. 8.

With this configuration, the light-transmissive protrusion 80A can change the conventional direction of travel of light traveling toward the oncoming traffic lane to a direction toward the driving lane (i.e., the lane in which the driver drives his or her own vehicle), and thereby brighten the driving lane. Thus, since this makes it possible to efficiently use light, it is possible to achieve an increase in lighting efficiency.

Moreover, for example, light exiting through exit surface 82A and transmitted by low beam lens 30A travels below and approximately parallel to central axis J in a side view.

With this configuration, the light-transmissive protrusion 80A changes the conventional direction of travel of light traveling forward and downward of vehicle body 110 to a direction comparatively farther ahead, to more brightly illuminate an area farther ahead. Thus, since this makes it possible to efficiently use light, it is possible to achieve an increase in lighting efficiency.

Moreover, for example, protrusion 80A includes a light-transmissive resin material.

With this configuration, since a resin material is used, protrusion 80A can be easily formed.

Moreover, for example, lighting apparatus 1A further includes shield 70A that is disposed between reflector 60A and low beam lens 30A and blocks a portion of the light reflected by reflector 60A, and protrusion 80A protrudes upward from the ceiling of shield 70A.

With this configuration, since protrusion 80A is provided on the ceiling of shield 70A, positioning of shield 70A and protrusion 80A can be performed simultaneously.

Moreover, for example, protrusion 80A is integrally formed with shield 70A.

With this configuration, since shield 70A and protrusion 80A are integrally formed, assembly can be simplified.

Moreover, for example, the surface of shield 70A nearest low beam lens 30A has a reflective film formed thereon, and entry surface 81A and exit surface 82A of protrusion 80A do not have a reflective film formed thereon.

With this configuration, for example, by forming reflective film 71A, light can be emitted above the horizon plane. As a result, signs above the road, for example, can be illuminated, and a more comfortable driving environment can be created for the driver.

Second Advantageous Effect, Etc.

As described above, lighting apparatus 1A according to Embodiment 2 is installed in automobile 100 and includes: low beam light-emitting device 11; first heat sink 51A thermally coupled to low beam light-emitting device 11; reflector 60A that reflects light emitted from low beam light-emitting device 11; low beam lens 30A that is disposed in a path of light reflected by reflector 60A and that transmits, light from reflector 60A along a predetermined direction; high beam light-emitting device 21 disposed further in the lighting direction than low beam light-emitting device 11; and second heat sink 52A that is thermally coupled to high beam light-emitting device 21 and disposed so that reflector 60A is between first heat sink 51A and second heat sink 52A. Second heat sink 52A includes: extension portion 53A extending long the lighting direction beyond reflector 60A; and reflective portion 54A that is fixed to extension portion 53A and reflects light emitted from low beam light-emitting device 11 and not reflected by reflector 60A.

With this configuration, light emitted from low beam light-emitting device 11 can be reflected by reflective portion 54A fixed to second heat sink 52A, instead of by reflector 60A, and illuminate an area above the horizon plane. Thus, since there is no need to increase the size of reflector 60A, there is also no need to increase the rigidity of reflector 60A and no need to increase the size of the structure for supporting reflector 60A (more specifically, the first heat sink 51A). For example, when reflector 60A is extended, the size of the lighting apparatus increases by an amount equal to the thickness of reflector 60A and the size of the gap between reflector 60A and second heat sink 52A. In contrast, with Embodiment 2, lighting apparatus 1A can be made compact.

Moreover, for example, lighting apparatus 1A further includes reflective film 71A that directs light toward low beam lens 30A by reflecting light reflected by reflective portion 54A.

With this configuration, light reflected by reflective portion 54A can be directed in a desired direction. This makes it possible to illuminate an area above the horizon plane, thereby making it possible to illuminate, for example, signs on the shoulder of the road or above the road. With this, a more comfortable driving environment can be created for the driver.

Moreover, for example, reflective portion 54A is a reflective film integrally formed with extension portion 53A.

With this configuration, reflective portion 54A can be realized, with a simple structure by using the surface of second heat sink 52A. Note that since light reflected by reflective portion 54A is light to be widely emitted in front of the vehicle and upward, reflective portion 54A is not required to have as precise control over the travel direction of light as reflector 60A. For example, the surface of second heat sink 52A can be used.

Moreover, for example, high beam light-emitting devices 21 through 23 are thermally coupled to extension portion 53A.

With this configuration, effective dissipation of heat from high beam light-emitting devices 21 through 23 is possible with second heat sink 52A.

Moreover, for example, light reflected by reflective portion 54A and transmitted by low beam lens 30A intersects central axis J of low beam lens 30A in a side view.

This makes it possible to illuminate an area above the horizon plane, thereby making it possible to, for example, illuminate signs and such on the shoulder of the road or above the road. With this, a more comfortable driving environment can be created for the driver.

Moreover, for example, low beam light-emitting device 11, first heat sink 51A, reflector 60A, low beam lens 30A, high beam light-emitting devices 21 through 23, and second heat sink 52A form a unit that fits within a predetermined circular region when viewed from the lighting direction.

With this configuration, low beam light-emitting device 11, low beam lens 30A, high beam light-emitting devices 21 through 23, and high beam lens 40A can be formed in a unit, which makes it possible to achieve a compact lighting apparatus 1A. In other words, lighting apparatus 1A according to Embodiment 2 is a lamp that is a single unit that can emit a low beam and a high beam. Therefore, compared to when separate lamps for low beam use and high beam use are required, the design freedom of automobile 100 can be greatly increased.

Variations

In Embodiment 2, reflective portion 54A is exemplified as a reflective film integrally formed with extension portion 53A of second heat sink 52A, but reflective portion 54A is not limited to this example. For example, reflective portion 54A may be formed as a separate component from second heat sink 52A.

Figure 11:
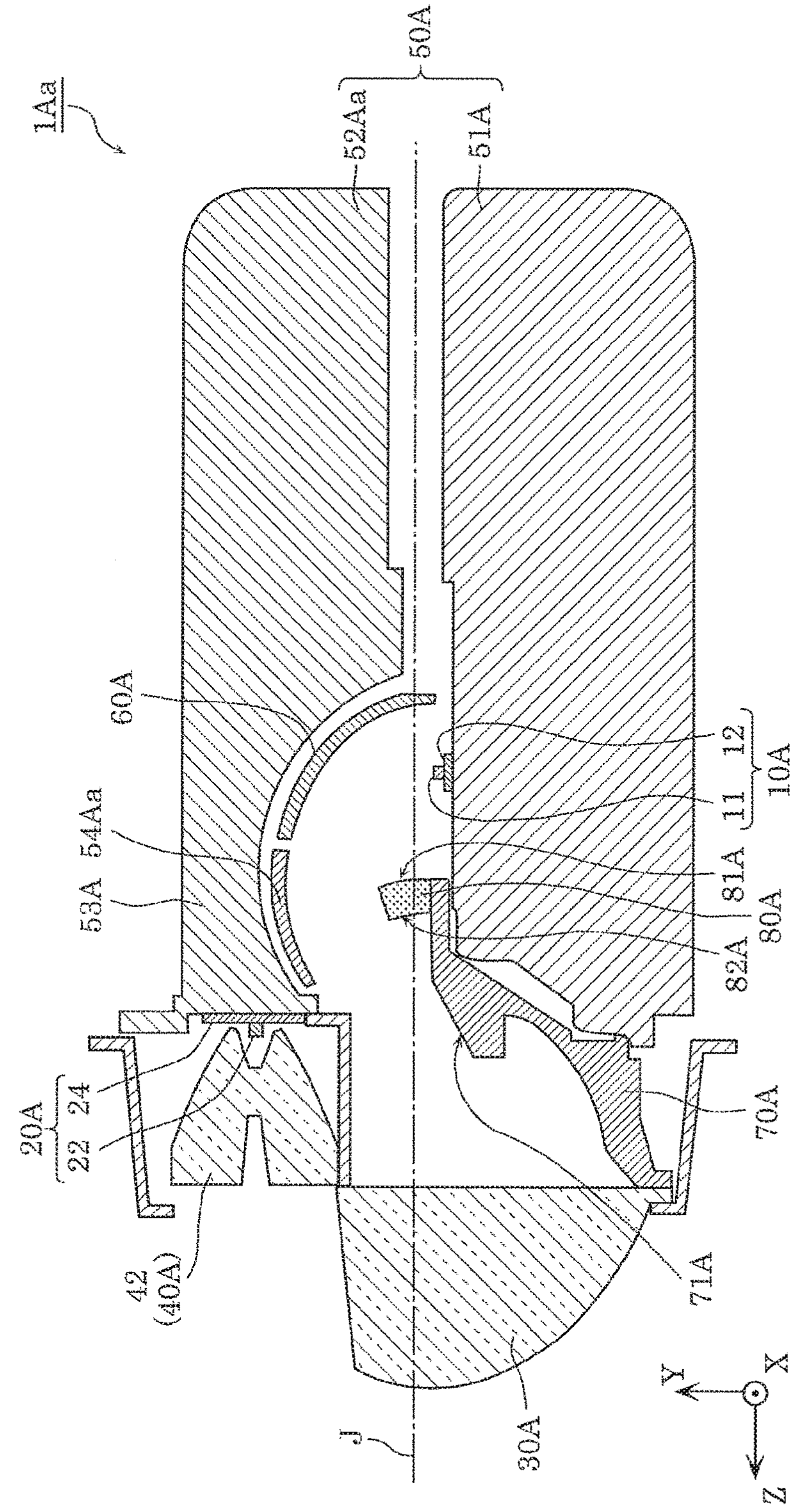
FIG. 11 is a cross sectional view of a lighting apparatus according to a variation of Embodiment 2 of the present disclosure.

FIG. 11 is a cross sectional view of lighting apparatus 1Aa according to the present variation. Similar to FIG. 6, FIG. 11 is a cross section taken along line VI-VI in FIG. 5.

In contrast to lighting apparatus 1A according to Embodiment 2, lighting apparatus 1Aa includes second heat sink 52Aa instead of second heat sink 52A. Second heat sink 52Aa includes reflective portion 54Aa instead of reflective portion 54A.

Reflective portion 54Aa is a reflective plate separate from reflector 60A. Reflective portion 54Aa is fixed to extension portion 53A of second heat sink 52Aa. Reflective portion 54Aa is, for example, formed by resin molding using a heat resistant resin, and a reflective film is formed on the surface of reflective portion 54Aa, similar to reflector 60A. The reflective film is, for example, an aluminum deposition film.

With this configuration, compared to when reflector 60A is extended, the size of reflector 60A reduced. Thus, there is no need to increase the rigidity of reflector 60A and no need to increase the size of the structure for supporting reflector 60A (the first heat sink 51A). This in turn makes it possible to achieve a compact lighting apparatus 1Aa.

Embodiment 3

Next, the lighting apparatus according to Embodiment 3 will be described.

The conventional lighting apparatus described in the background section includes a protrusion acting as a shield that blocks a portion of the light reflected from a reflector in order to reduce glare for the oncoming traffic lane. As a result, a portion of the light emitted by the light-emitting device is blocked by the protrusion acting as a shield and not emitted forward. In other words, with the conventional lighting apparatus, light emitted by the light-emitting device cannot be effectively used for illumination purposes, and thus has a low lighting efficiency.

In view of this, one object of the present disclosure is to provide a lighting apparatus which can achieve a further increase in lighting efficiency and a mobile object including the lighting apparatus.

In order to achieve the above described object, the lighting apparatus according to Embodiment 3 is a lighting apparatus to be installed on a mobile object, and includes: a light-emitting device, a reflector that reflects light emitted from the light-emitting device; a lens disposed in a path of light reflected by the reflector; and a light guide disposed between the reflector and the lens. The light guide changes a traveling direction of the light from the reflector to guide the light to the lens.

According to Embodiment 3, lighting efficiency can be further increased.

Lighting Apparatus

First, lighting apparatus 1B according to Embodiment 3 will be described with reference to FIG. 12 through FIG. 15.

Figure 12:
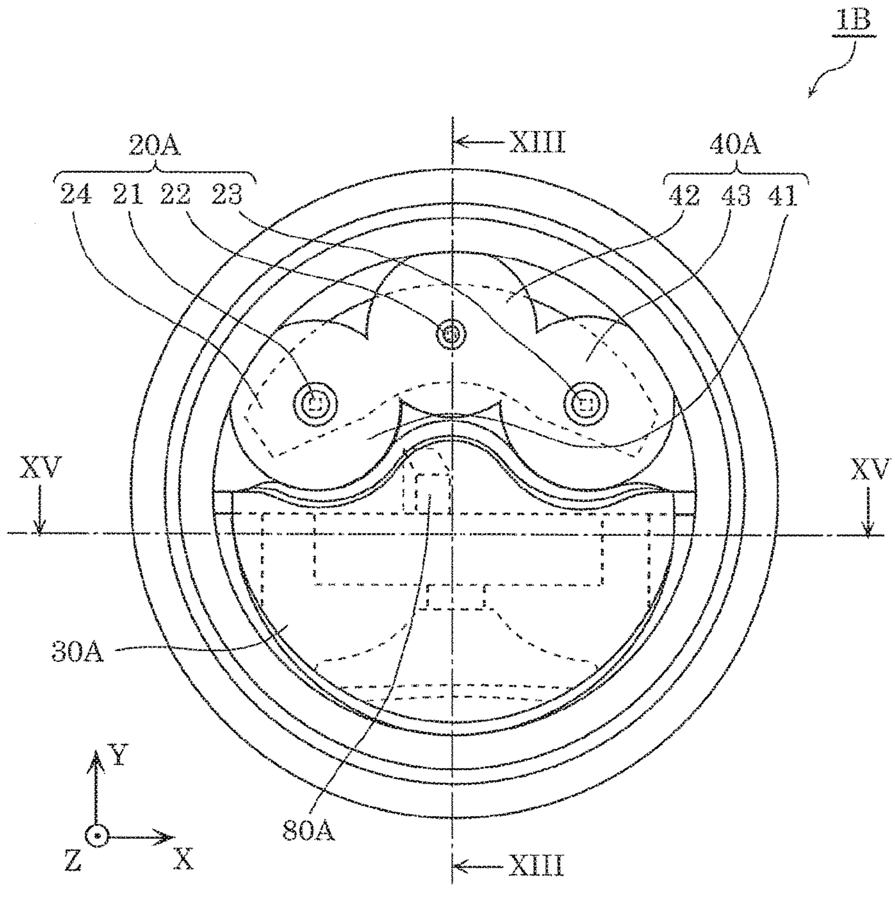
FIG. 12 is a front view of a lighting apparatus according to Embodiment 3 of the present disclosure.
Figure 13:
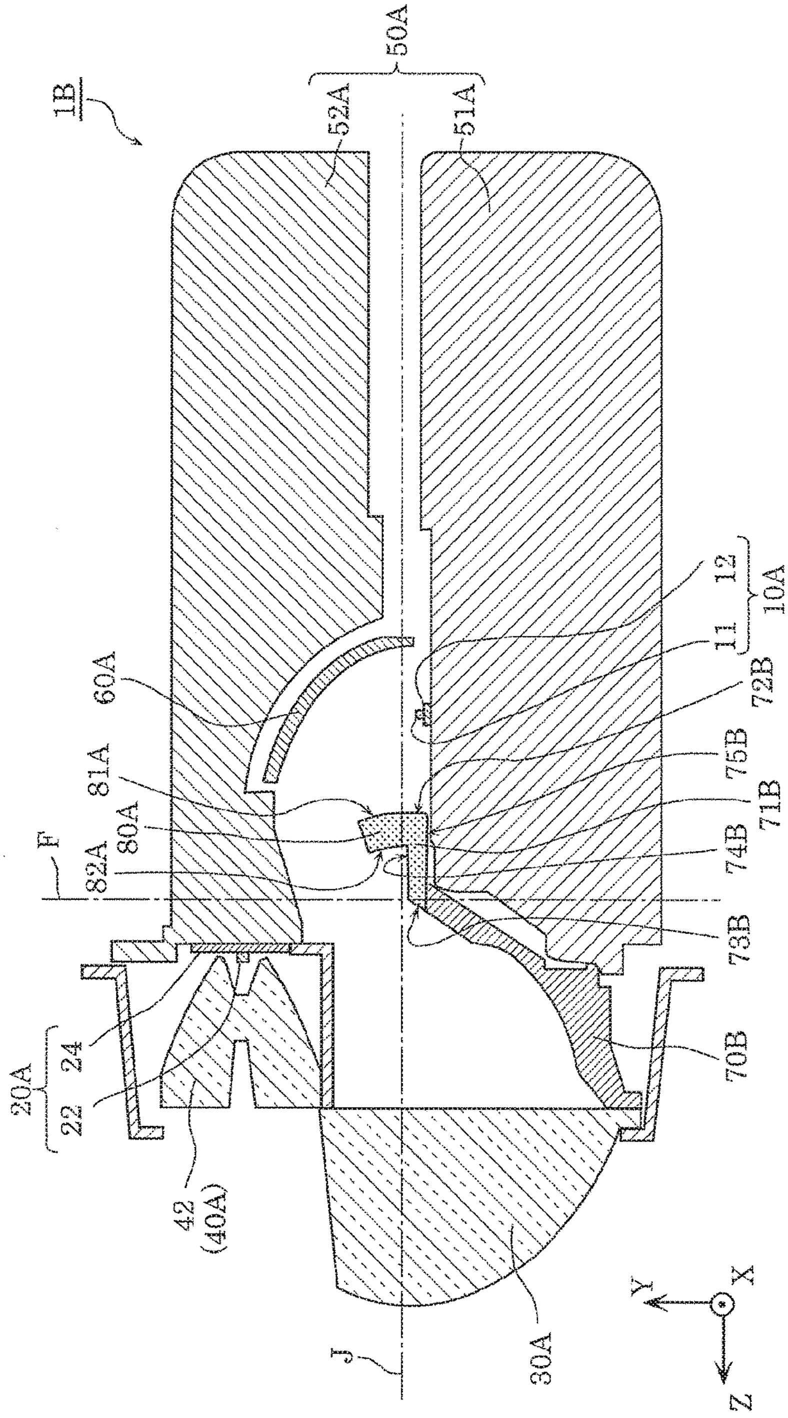
FIG. 13 is a cross sectional view of a lighting apparatus according to Embodiment 3 of the present disclosure, taken along line XIII-XIII in FIG. 12.

FIG. 12 is a front view of lighting apparatus 1B according to Embodiment 3. FIG. 13 is a cross sectional view of lighting apparatus 1B according to Embodiment 3, taken along line XIII-XIII in FIG. 12. More specifically, FIG. 13 is vertical cross section taken down the center of lighting apparatus 1B.

Figure 14:
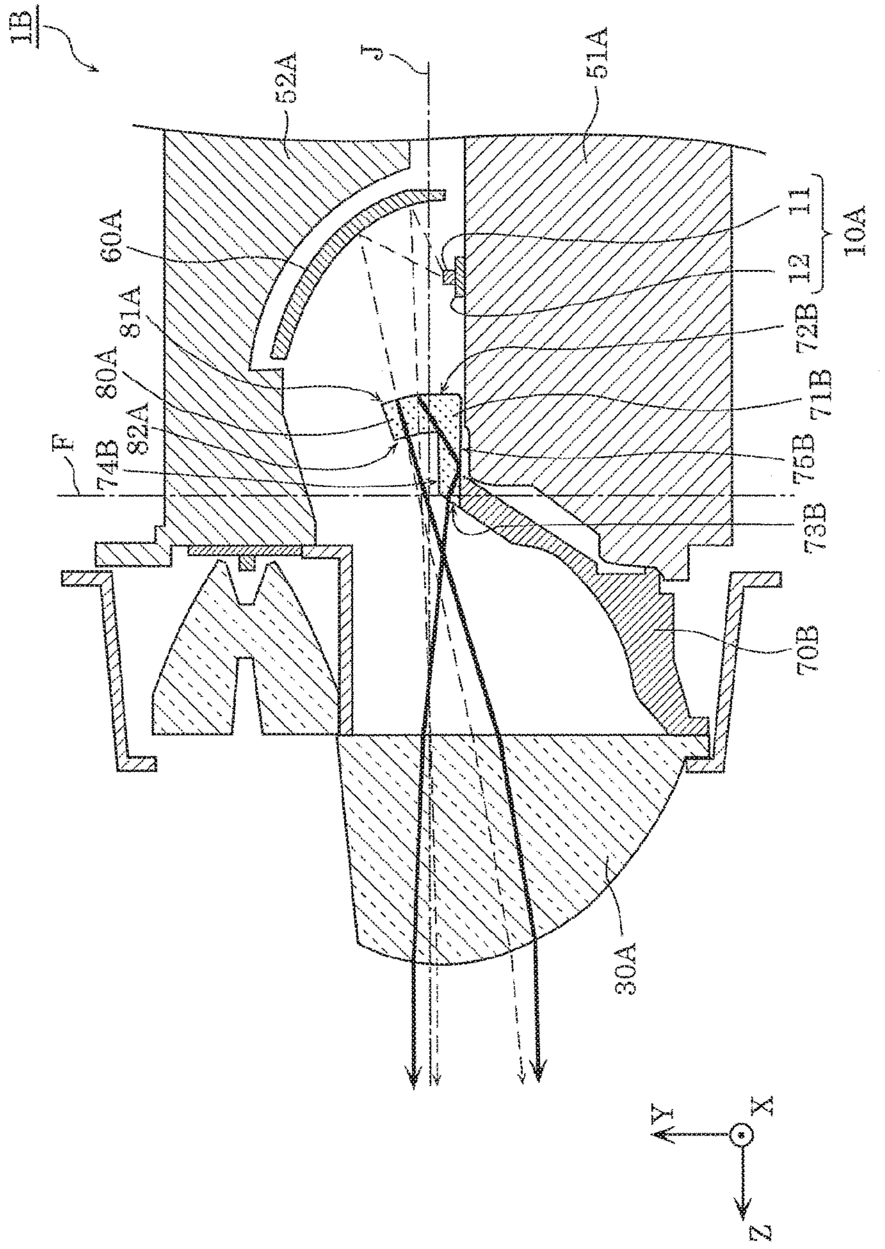
FIG. 14 is a cross sectional view of a lighting apparatus according to Embodiment 3 of the present disclosure, taken along line XIII-XIII in FIG. 12, and illustrates a path of light passing through a light guide and a path of light passing through a protrusion.

FIG. 14 is a cross sectional view of lighting apparatus 1B according to Embodiment 3, taken along line XIII-XIII in FIG. 12, and illustrates a path of light passing through light guide 71B and a path of light passing through protrusion

Figure 15:
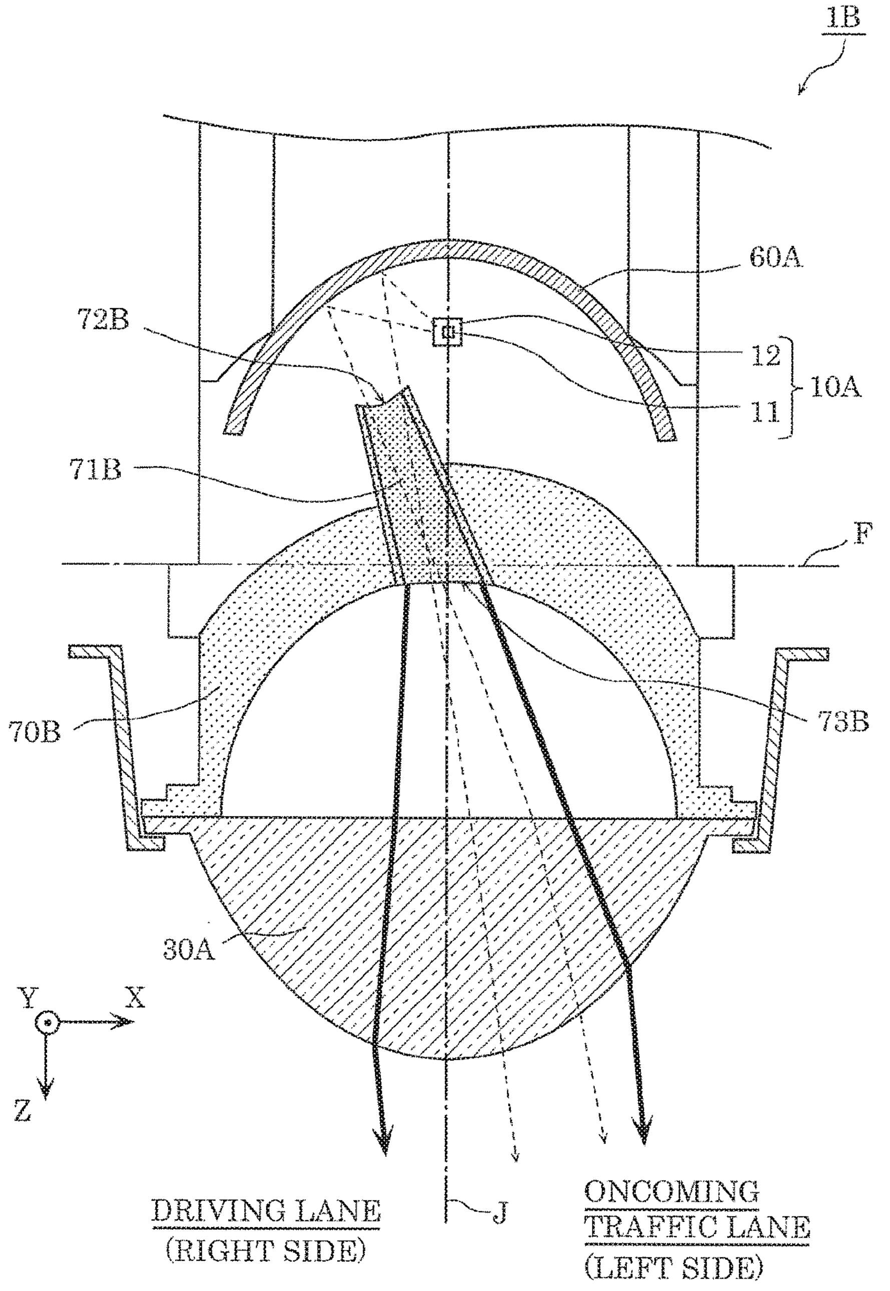
FIG. 15 is a cross sectional view of a lighting apparatus according to Embodiment 3 of the present disclosure, taken along line XV-XV in FIG. 12, and illustrates paths of light passing through a light guide.

80A. FIG. 15 is a cross sectional view of lighting apparatus 1B according to Embodiment 3, taken along line XV-XV in FIG. 12, and illustrates paths of light passing through light guide 71B. Moreover, in FIG. 15, the vertically drawn dotted and dashed line is central axis J of low beam lens 30A. Central axis J passes through the approximate center of lighting apparatus 1B.

Note that in FIG. 14 and FIG. 15, the bold solid line arrows indicate the paths of light passing through light guide 71B and protrusion 80A according to Embodiment 3. The thin broken line arrows are provided as a comparative example of paths of light when light guide 71B and protrusion 80A according to Embodiment 3 is not provided.

Similar to lighting apparatus 1A according to Embodiment 2, lighting apparatus 1B according to Embodiment 3 is installed on a mobile object. Lighting apparatus 1B is, for example, attached to automobile 100 illustrated in FIG. 1. In other words, automobile 100 may include, in the front of vehicle body 110, lighting apparatus 1B according to Embodiment 3 instead of lighting apparatus 1 according to Embodiment 1.

As illustrated in FIG. 12 and FIG. 13, lighting apparatus 1B includes, as the main body of the lamp, low beam light source module 10A, high beam light source module 20A, low beam lens 30A, high beam lens 40A, heat dissipator 50A, reflector 60A, shield 70B, light guide 71B, and protrusion 80A. Although not illustrated in the Drawings, lighting apparatus 1B further includes a lighting controller that controls low beam light source module 10A and high beam light source module 20A.

As illustrated in FIG. 12, lighting apparatus 1B is configured to fit within a predetermined circular region when viewed from the lighting direction (i.e., when viewed along the Z axis). More specifically, low beam light source module 10A, high beam light source module 20A, low beam lens 30A, high beam lens 40A, heat dissipator 50A, reflector 60A, shield 70B, light guide 71B, and protrusion 80A form a unit that fits within a predetermined circular region when viewed along the Z axis. The predetermined circular region is, for example, ⍰ 70 mm (in diameter).

Hereinafter, each element of lighting apparatus 1B will be described in detail. Note that description of configurations that are the same as in Embodiment 2 are omitted or condensed.

Shield

Similar to shield 70A according to Embodiment 2, Shield 70B is one example of a shield that blocks a portion of the light reflected by reflector 60A. More specifically, shield 70B is a structure that defines a predetermined cutoff line—which is a boundary between dark and light areas—by blocking a portion of light emitted by low beam light source module 10A.

Shield 70B is disposed between reflector 60A and low beam lens 30A. More specifically, shield 70B is fixed to first heat sink 51A.

Shield 70B is, for example, formed using a heat resistant resin or fiber reinforced plastic, similar to reflector 60A. The surface of shield 70B nearest low beam lens 30A has a reflective film formed thereon. The reflective film is, for example, an aluminum deposition film.

Light Guide

Light guide 71B is a portion of shield 70B and is located between reflector 60A and low beam lens 30A.

As illustrated in FIG. 13 through FIG. 15, light guide 71B includes entry surface 72B, exit surface 73B, ceiling surface 74B, and bottom surface 75B. Light guide 71B diffuses, about central axis J, light reflected by reflector 60A and entering through entry surface 72B, and transmits the light through exit surface 73B toward low beam lens 30A. More specifically, light guide 71B diffuses, toward the driving lane, light entering through entry surface 72B, and directs the light to illuminate an area above the horizon line.

As illustrated in FIG. 15, entry surface 72B has a convex surface receding away from reflector 60A. Entry surface 72B includes, for example, a portion of a spheroid.

Entry surface 72B is disposed in a position offset from central axis J in a top view. The direction in which entry surface 72B is offset from central axis J and the amount of offset (i.e., the distance between the two) is substantially equal to the direction in which entry surface 81A of protrusion 80A is offset from central axis J and the amount of offset (i.e., the distance between the two). In Embodiment 3, entry surface 72B is offset to the driving lane side (right side) of central axis J.

As illustrated in FIG. 15, exit surface 73B has a concave surface receding toward reflector 60A. Exit surface 73B includes, for example, a portion of a spheroid.

Exit surface 73B is disposed so as to intersect central axis J in a top view. More specifically, as illustrated in FIG. 15, exit surface 73B is disposed such that the center in a top view intersects central axis J.

Ceiling surface 74B is a top surface between entry surface 72B and exit surface 73B of light guide 71B. More specifically, ceiling surface 74B is the surface that opposes second heat sink 52A. A reflective film is formed on ceiling surface 74B of light guide 71B. This makes it possible to inhibit light from entering through ceiling surface 74B.

Bottom surface 75B is a bottom surface between entry surface 72B and exit surface 73B of light guide 71B. More specifically, bottom surface 75B is the surface that opposes first heat sink 51A. A reflective film is formed on bottom surface 75B of light guide 71B.

Light guide 71B is integrally formed with shield 70B. More specifically, when the reflective film is formed on the surface of shaped heat-resistant resin or fiber reinforced plastic, light guide 71B can be formed without forming a reflective film on entry surface 72B and exit surface 73B. Moreover, protrusion 80A can be formed in the same manner. Note that the reflective film is, for example, an aluminum deposition film.

Note that in Embodiment 3, a space is formed between first heat sink 51A and second heat sink 52A where low beam light source module 10A, reflector 60A, light guide 71B, and protrusion 80A are disposed, as illustrated in FIG. 13. Moreover, side surface 83A and side surface 84A of protrusion 80A are approximately flush with a portion of a side surface of light guide 71B (the portion on the entry surface 72B side).

Light Passing Through Light Guide

Next, paths of light reflected by passing through light guide 71B according to Embodiment 3 will be described with reference to FIG. 14 and FIG. 15.

Light emitted upward by low beam light-emitting device 11 is reflected by reflector 60A and travels forward. As illustrated in FIG. 14 and FIG. 15, a portion of the light reflected by reflector 60A (indicated by the thin broken lines) is incident on entry surface 72B of light guide 71B and enters light guide 71B. Light incident on light guide 71B travels into light guide 71B, exits through exit surface 73B, and travels toward low beam lens 30A.

Here, the difference in the refractive index of light guide 71B and the surrounding area (air) causes the light to refract. For example, the refractive index of light guide 71B is approximately 1.48 to 1.60, inclusive. Moreover, light inside light guide 71B is reflected by bottom surface 75B, as illustrated in FIG. 14. With this, light exiting through exit surface 73B of light guide 71B travels in an upward direction, as illustrated in FIG. 14. In other words, light guide 71B changes the direction of travel of light entering through entry surface 72B to an upward direction, and transmits the light through exit surface 73B. Note that in the example illustrated in FIG. 14, light is exemplified as only being reflected off bottom surface 75B, but a portion of light inside light guide 71B is also reflected off ceiling surface 74B.

With this, light exiting through exit surface 73B of light guide 71B (bold solid line) and transmitted by low beam lens 30A travels above central axis J, in a direction approximately parallel to central axis J, as illustrated in FIG. 14. In other words, light exiting through exit surface 73B of light guide 71B illuminates an area above the horizon plane.

Moreover, light exiting through exit surface 73B of light guide 71B diffuses about central axis J more widely than when light guide 71B is omitted, as illustrated in FIG. 15. More specifically, in focal plane F of low beam lens 30A, light that has passed through light guide 71B (indicated by the bold solid lines) is diffused wider about central axis J than if light guide 71B were omitted (indicated by the thin broken lines). Thus, since low beam lens 30A inversely projects a distribution of light passing through focal plane F, diffused light is projected in front of low beam lens 30A.

Figure 16:
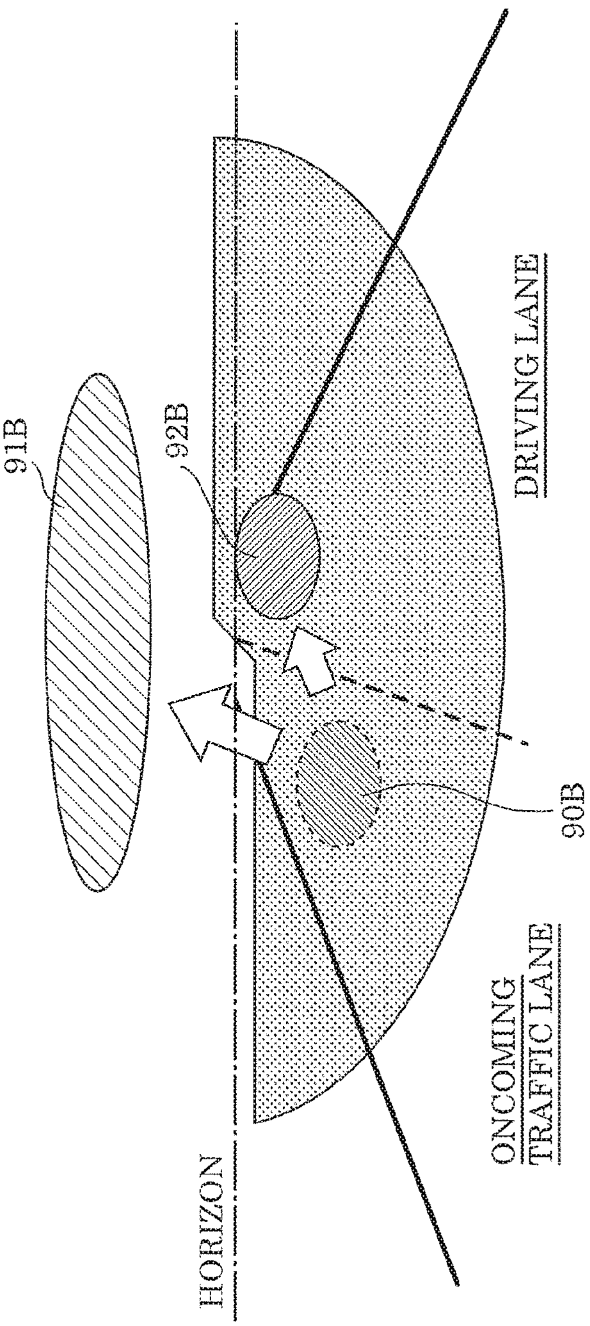
FIG. 16 illustrates a change in the direction of travel of light caused by a light guide and protrusion according to Embodiment 3 of the present disclosure.

FIG. 16 illustrates the change in the direction of travel of light caused by light guide 71B and protrusion 80A according to Embodiment 3. In FIG. 16, the region shaded with dots is the area illuminated by light emitting from low beam lenses 30A (i.e., the area illuminated by the low beams).

As described above, light guide 71B can change the direction of travel of light that would illuminate the oncoming traffic lane if light guide 71B were omitted, to a direction that light illuminates an area above the horizon and illuminates a broader area. In other words, as illustrated in FIG. 16, light guide 71B can, for example, brightly illuminate area 91B instead of reducing the brightness of region 90B. With this, for example, signs and such above the road, for example, can be illuminated, and a more optimal driving environment can be created for the driver.

Advantageous Effects, Etc.

As described above, lighting apparatus 1B according to Embodiment 3 is installed in automobile 100 and includes: low beam light-emitting device 11; reflector 60A that reflects light emitted from low beam light-emitting device 11; low beam lens 30A disposed in a path of light reflected by reflector 60A; and light guide 71B disposed between reflector 60A and low beam lens 30A. Light guide 71B includes entry surface 72B and exit surface 73B, diffuses, about central axis J of low beam lens 30A, light reflected by reflector 60A and entering through entry surface 72B, and transmits the light through exit surface 73B toward low beam lens 30A.

With this configuration, light guide 71B can change the direction of travel of light that would illuminate the oncoming traffic lane if light guide 71B were omitted to a direction light illuminates an area above the horizon and illuminates a broader area. Thus, since this makes it possible to efficiently use light, it is possible to achieve an increase in lighting efficiency. Moreover, for example, signs and such above the road, for example, can be illuminated, and a more optimal driving environment can be created for the driver.

Moreover, for example, a reflective film is formed on bottom surface 75B between entry surface 72B and exit surface 73B of light guide 71B.

Moreover, for example, a reflective film is formed on ceiling surface 74B between entry surface 72B and exit surface 73B of light guide 71B.

This makes it possible to inhibit light from entering light guide 71B through ceiling surface 74B. Moreover, light traveling through light guide 71B can be inhibited from exiting through ceiling surface 74B. Moreover, by allowing for reflection to occur between ceiling surface 74B and bottom surface 75B, light can be transmitted through exit surface 73B in a nearly horizontal direction.

Moreover, for example, entry surface 72B has a concave surface receding away from reflector 60A, and exit surface 73B has a concave surface receding toward reflector 60A.

With this configuration, the difference in the indexes of refraction between light guide 71B and the surrounding area (air) can be used to change the direction of travel of light and diffuse the light.

Moreover, for example, entry surface 72B is offset from central axis J of low beam lens 30A in a top view, and exit surface 73B is disposed so as to intersect central axis J of low beam lens 30A in a top view.

With this configuration, since the conventional (when light guide 71B is omitted) direction of travel of light traveling toward the oncoming traffic lane can be diffused, it is possible to achieve an increase in lighting efficiency.

Moreover, for example, lighting apparatus 1B further includes light-transmissive protrusion 80A that protrudes upward from ceiling surface 74B of light guide 71B. Moreover, for example, protrusion 80A protrudes upward from a portion of ceiling surface 74B of light guide 71B where no reflective film is formed.

With this configuration, for example, the light-transmissive protrusion 80A can change the conventional direction of travel of light traveling toward the oncoming traffic lane to a direction toward the driving lane (i.e., the lane in which the driver drives his or her own vehicle), and thereby brighten the driving lane. Thus, since this makes it possible to efficiently use light, it is possible to achieve an increase in lighting efficiency.

For example, as illustrated in FIG. 14, a portion of the light reflected by reflector 60A (thin broken lines) enters protrusion 80A through entry surface 81A of protrusion 80A. Light incident on protrusion 80A travels into protrusion 80A, exits through exit surface 82A, and travels toward low beam lens 30A.

In this way, according to Embodiment 3, as a result of protrusion 80A refracting light, light that would illuminate the oncoming traffic lane can be directed to the driving line (i.e., the lane in which the driver drives his or her own vehicle). More specifically, protrusion 80A changes the direction of travel of light that would illuminate the oncoming traffic lane if protrusion 80A were omitted, to a direction more toward the driving lane and farther away. In other words, as illustrated in FIG. 16, protrusion 80A changes the direction of travel of light illuminating region 90B to a direction that illuminates region 92B. With this, region 92B can be brightly illuminated instead of reducing the brightness of region 90B.

Moreover, for example, light exiting through exit surface 73B and transmitted by low beam lens 30A travels above and approximately parallel to central axis J in a side view.

This makes it possible to illuminate an area above the horizon plane, thereby making it possible to, for example, illuminate signs and such on the shoulder of the road or above the road. With this, a more comfortable driving environment can be created for the driver.

Moreover, for example, light guide 71B includes a light-transmissive resin material.

With this configuration, since a resin material is used, light guide 71B can be easily formed.

Other Variations

Hereinbefore the lighting apparatus according to the present disclosure has been described based on the above examples and variations, but the present disclosure is not limited to those examples.

For example, in Embodiments 1 through 3 above, the lighting apparatus is exemplified as including a plurality of high beam light-emitting devices 21 through 23, but the lighting apparatus may include only a single high beam light-emitting device.

Moreover, for example, in Embodiment 1 above, heat dissipator 50 is exemplified as having a back end portion that extends upward, but heat dissipator 50 is not limited to this example. For example, heat dissipator 50 may extend downward and, alternatively, may extend backward. For example, heat dissipator 50 may extend downward from the bottom surface (i.e., from the surface opposite placement surface 51).

Moreover, for example, in Embodiment 2 above, protrusion 80A is exemplified as being disposed between focal plane F of low beam lens 30A and reflector 60A, but the location of protrusion 80A is not limited to this example. Protrusion 80A may be disposed on the same side of low beam lens 30A as focal plane F.

Moreover, for example, in Embodiment 2 above, protrusion 80A and shield 70A are exemplified as being integrally formed, but protrusion 80A and shield 70A are not limited to this example. Protrusion 80A and shield 70A may be formed as separate components. Moreover, protrusion 80A may be fixed to first heat sink 51A.

For example, in Embodiment 3 above, ceiling surface 74B and bottom surface 75B of light guide 71B are exemplified as having a reflective film thereon, but no reflective film may be formed on ceiling surface 74B and bottom surface 75B. Even in this case, light traveling through light guide 71B is reflected by ceiling surface 74B and bottom surface 75B as it travels due to the difference in the refractive index of light guide 71B and the surrounding area.

Moreover, for example, in Embodiment 3 above, protrusion 80A and light guide 71B are exemplified as being integrally formed, but protrusion 80A and light guide 71B are not limited to this example. Protrusion 80A and light guide 71B (or shield 70B) may be formed as separate components. Moreover, lighting apparatus 1B is not required to include protrusion 80A.

Moreover, for example, the shapes and arrangement of light guide 71B and protrusion 80A are not limited to the examples given above. For example, protrusion 80A may be disposed to the low beam lens 30A side of focal plane F.

Moreover, for example, in the above embodiments, automobile 100 is exemplified as including two lighting apparatuses 1 (headlamps 120), but automobile 100 is not limited to this example. For example, automobile 100 may include three or more lighting apparatuses 1, such as two lighting apparatuses 1 on each of the left and right sides of vehicle body 110, and, alternatively, may include only one lighting apparatus 1.

For example, the above embodiments are applied to headlamps which emit low beams and high beams is given, but may be applied to fog lamps or day time running light (DRM) headlamps.

Moreover, for example, in the above embodiments, LEDs are given as an example of the light-emitting devices, but laser devices such as semiconductor lasers, or light-emitting devices such as organic electro-luminescence (EL devices) and non-organic EL devices may be used.

Moreover, for example, in the above embodiments, automobile 100 is exemplified as a four-wheeled automobile, but automobile 1 may be a different automobile such as a two-wheeled automobile.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus to be installed on a mobile object, the lighting apparatus comprising:

a heat dissipator having a first outer surface and a second outer surface different from the first outer surface;

a first light-emitting device thermally coupled to the first outer surface of the heat dissipator;

a second light-emitting device thermally coupled to the second outer surface of the heat dissipator;

a reflector that reflects light emitted from the first light-emitting device;

a first lens that is disposed in a path of light reflected by the reflector and that transmits the light from the reflector along a predetermined lighting direction; and a second lens disposed in a path of light from the second light-emitting device, wherein the heat dissipator includes:

a first heat dissipator thermally coupled to the first light-emitting device; and a second heat dissipator thermally coupled to the second light-emitting device and disposed so that the reflector is between the first heat dissipator and the second heat dissipator, and the second heat dissipator includes:

an extension portion extending along the lighting direction beyond the reflector; and a reflective portion that is fixed to the extension portion and reflects light emitted from the first light-emitting device and not reflected by the reflector.

2. The lighting apparatus according to claim 1, further comprising a shield disposed between the reflector and the first lens to block a portion of the light reflected by the reflector, the shield being attached to the first outer surface.

3. The lighting apparatus according to claim 2, wherein the shield is disposed between the first outer surface and a central axis of the first lens.

4. The lighting apparatus according to claim 2, wherein the shield defines a cutoff line.

5. The lighting apparatus according to claim 1, wherein the heat dissipator extends to cover a side of the reflector opposite a reflective surface of the reflector.

6. The lighting apparatus according to claim 1, wherein the second light-emitting device comprises a plurality of second light-emitting devices.

7. The lighting apparatus according to claim 1, further comprising a light guiding component that is disposed between the reflector and the first lens, and that changes a traveling direction of the light from the reflector to guide the light to the first lens.

8. The lighting apparatus according to claim 1, further comprising a light guide that is disposed between the reflector and the first lens, diffuses light from the reflector around a central axis of the first lens, and guides the diffused light toward the first lens.

9. The lighting apparatus according to claim 1, wherein the first light-emitting device is for generation of a low beam that illuminates an area forward and downward of the mobile object, and the second light-emitting device is for generation of a high beam that illuminates an area far ahead of the mobile object.

10. The lighting apparatus according to claim 1, wherein the heat dissipator, the first light-emitting device, the second light-emitting device, the reflector, the first lens, and the second lens form a unit that fits within a predetermined circular region when viewed from the lighting direction.

11. The lighting apparatus according to claim 1, wherein each of the first light-emitting device and the second light-emitting device is one of a light-emitting diode (LED) and a laser device.

12. A mobile object comprising the lighting apparatus according to claim 1 installed in a front portion.

* * * * *